United States Patent [19]

Krueger et al.

[11] Patent Number: 5,634,050
[45] Date of Patent: May 27, 1997

[54] METHOD AND SYSTEM FOR FILE SYSTEM MANAGEMENT USING A FLASH-ERASABLE PROGRAMMABLE, READ-ONLY MEMORY

[75] Inventors: William J. Krueger, Redmond; Sriram Rajagopalan, Bellevue, both of Wash.

[73] Assignee: Microsoft Corporation, Redmond, Wash.

[21] Appl. No.: 473,763

[22] Filed: Jun. 7, 1995

Related U.S. Application Data

[62] Division of Ser. No. 828,763, Jan. 29, 1992.

[51] Int. Cl.$^6$ ........................................ G06F 17/30
[52] U.S. Cl. ......................... 395/616; 364/DIG. 1; 364/222.81
[58] Field of Search ........................................ 395/600

[56] References Cited

U.S. PATENT DOCUMENTS

| | | | |
|---|---|---|---|
| 4,408,273 | 10/1983 | Plow | 364/200 |
| 4,435,752 | 3/1984 | Winkelman | 395/600 |
| 4,507,752 | 3/1985 | McKenna et al. | 364/200 |
| 4,584,644 | 4/1986 | Larner | 364/200 |
| 4,606,002 | 8/1986 | Waisman et al. | 364/200 |
| 4,630,234 | 12/1986 | Holly | 364/900 |
| 4,704,678 | 11/1987 | May | 364/200 |
| 4,939,598 | 7/1990 | Kulakowski | 360/48 |
| 4,942,541 | 7/1990 | Hoel et al. | 364/519 |
| 4,953,080 | 8/1990 | Dysart et al. | 364/200 |
| 4,953,122 | 8/1990 | Williams | 364/900 |
| 4,989,132 | 1/1991 | Mellender et al. | 364/200 |
| 5,025,367 | 6/1991 | Gurd et al. | 364/200 |
| 5,029,125 | 7/1991 | Sciupac | 395/600 |
| 5,060,147 | 10/1991 | Mattheyses | 364/200 |
| 5,115,504 | 5/1992 | Belove et al. | 395/600 |
| 5,132,853 | 7/1992 | Kulakowski | 369/44.27 |
| 5,161,256 | 11/1992 | Iijima | 902/26 |
| 5,229,992 | 7/1993 | Jurkevich et al. | 370/82 |
| 5,247,516 | 9/1993 | Bernstein et al. | 370/82 |
| 5,247,658 | 9/1993 | Barrett et al. | 395/600 |
| 5,257,141 | 10/1993 | Matsumi et al. | 360/32 |
| 5,268,870 | 12/1993 | Harari | 365/218 |

FOREIGN PATENT DOCUMENTS

| | | | |
|---|---|---|---|
| 0251461A3 | 1/1988 | European Pat. Off. | G06F 12/02 |
| 0389396A2 | 9/1990 | European Pat. Off. | G06F 3/06 |
| 0439920A3 | 8/1991 | European Pat. Off. | G06F 12/02 |

OTHER PUBLICATIONS

Robert L. Kruse; "Data Structures & Program Design"; *Prentice-Hall, Inc.*; 1984; pp. 40–83.

Doug Cooper and Michael Clancy; "Oh! Pascal!"; 1982; pp. 475–523.

Simson Garfinkel; "Designing a Write–Once File System"; *Dr. Dobb's Journal*; vol. 16, No. 1; Jan. 1991; pp. 78, 80, and 82–86.

*Primary Examiner*—Wayne Amsbury
*Attorney, Agent, or Firm*—Seed and Berry LLP

[57] ABSTRACT

A method and system for managing memory in a block-erasable, flash-erasable, programmable, read-only memory. The system comprises a block-erasable FEProm with a block header, a block allocation table, a data storage area, a block allocation routine for selecting a block in which to store data, a data area allocation routine for selecting an entry in the block allocation table and a portion of the data storage area, and a storage routine for storing the data. The system includes a file manager to implement a file system for the block-erasable FEProm.

45 Claims, 33 Drawing Sheets

Block-Erasable FEProm

METHOD AND SYSTEM FOR FILE SYSTEM MANAGEMENT USING A FLASH-ERASABLE PROGRAMMABLE, READ-ONLY MEMORY

CROSS-REFERENCE TO RELATED APPLICATION

This application is a division of U.S. patent application Ser. No. 07/828,763, filed Jan. 29, 1992, pending.

TECHNICAL FIELD

This invention relates generally to a computer system for managing files and, more specifically, to a method and system for managing files stored on a flash-erasable, programmable, read-only memory (FEProm).

BACKGROUND ART

A computer system generally supports the storage of information on both volatile and nonvolatile storage devices. The difference between a volatile and nonvolatile storage device is that when power is disconnected from a volatile storage device the information is lost. Conversely, when power is disconnected from a nonvolatile storage device the information is not lost. Thus, the storing of information on a nonvolatile storage device allows a user to enter information at one time and retrieve the information at a later time, even though the computer system may have been powered down. A user could also disconnect a nonvolatile storage device from a computer and connect the storage device to a different computer to allow the different computer to access the information.

The information stored on nonvolatile storage devices is generally organized into files. A file is a collection of related information. Over the course of time, a computer system can store hundreds and thousands of files on a storage device, depending upon the capacity of the device. In addition to storing the information, the computer system will typically read, modify, and delete the information in the files. It is important that the computer system organize the files on the storage device so that the storing, reading, modifying, and deleting can be accomplished efficiently.

File systems, which are generally part of a computer operating system, were developed to aid in the management of the files on storage devices. One such file system was developed by Microsoft Corporation for its Disk Operating System (MS-DOS). This file system uses a hierarchical approach to storing files. FIG. 1A shows a pictorial representation of the directory structure for a storage device. Directories contain a logical group of files. Directories organize files in a manner that is analogous to the way that folders in a drawer organize the papers in the drawer. The blocks labeled DOS, WORD, DAVID, and MARY represent directories, and the blocks labeled AUTOEXEC.BAT, COMMAND.COM, FORMAT.EXE, LETTER2.DOC, LETTER.DOC, and two files named LETTER1.DOC represent files. The directory structure allows a user to organize files by placing related files in their own directories. In this example, the directory WORD may contain all the files generated by the word-processing program WORD. Within directory WORD are two subdirectories DAVID and MARY, which aid in further organizing the WORD files into those developed by David and those developed by Mary.

Conventional file systems take advantage of the multiple-write capability of the nonvolatile store devices. The multiple-write capability allows any bit of information on the storage device to be changed from a one to zero and from a zero to one a virtually unlimited number of times. This capability allows a file to be written to the storage device and then selectively modified by changing some bits of the file.

The disadvantage of the conventional storage devices with multiple-write capability, such as a disk, is their slow speed relative to the speed of the internal computer memory. Conversely, the advantage of these storage devices over computer memory include their non-volatility, low cost, and high capacity.

A storage device known as a Flash-EProm (FEProm) has the speed of internal computer memory combined with the nonvolatility of a computer disk. This device is an EProm-type (Erasable, Programmable, Read-Only Memory) device. The contents of the FEProm can be erased by applying a certain voltage to an input rather than by shining ultraviolet light on the device like the typical EProm. The erasing sets each bit in the device to the same value. Like other EProms, the FEProm is a nonvolatile memory. The FEProms are comparable in speed to the internal memory of a computer. Initially, and after erasure, each bit of the FEProm is set to a 1. A characteristic of the FEProm as with other EProms is that a bit value of 1 can be changed to a 0, but a bit value of 0 cannot be changed to a 1. Thus, data can be written to the EProm to effect the changing of a bit from a 1 to a 0. However, once a bit is changed to a 0, it cannot be changed back to a 1, that is, unless the entire FEProm is erased to all ones. Effectively, each bit of the FEProm can only be written once but read many times between subsequent erasures. Moreover, each bit of an FEProm can only be erased and set to 0 a limited number of times. The limited number of times defines the effective life of an FEProm.

The typical time to access an FEProm varies according to the type of access and several other factors. The read access time is in the range of hundreds of nanoseconds, and there is no limit as to the number of times a byte may be read. The write access time is typically in the range of tens of microseconds. The write access time is affected by the number of times the byte has been erased, the device temperature, and the byte-density of the FEProm. Although there is no theoretical limit to the number of times a byte may be written, the erase limit provides a practical write limit. The erase time for an FEProm is in the range of a few seconds. The erase time is affected by the number of times the FEProm has been erased, the device temperature, and the byte-density of the FEProm.

Because conventional file systems assume that the storage device has the multiple-write capability, these file systems are not appropriate for the FEProm, which effectively has only a single-write capability. It would be desirable to have a file system that supports a storage device based on the FEProm. Such a file system would have the speed of computer memory and the nonvolatility of computer disks.

Conventional storage devices, such as computer disks, are block addressable, rather than byte addressable. A byte is the unit of addressability of the internal memory of the computer, that is, the computer can write or read one byte (typically, eight bits) at a time, but not less. When the computer writes to or reads from a disk it must do so in groups of bytes called a block. Block sizes can vary, but typically are a power of two (128, 256, 512, etc.). For example, if only one byte on a disk is to be changed, then the entire number of bytes in the block size must be written. This may involve the reading of the entire block from disk into the computer memory, changing the one byte (the internal memory is byte addressable), and writing the entire block to the disk.

Conventional file systems store data in a way that leaves unused portions of blocks. The file systems store data from only one file in any given block at a time. The file systems do not, for example, store data from one file in the first 50 bytes of a block and data from another file the last 78 bytes of a 128-byte block. If, however, the length of a file is not an even multiple of the block size, space at the end of a block is unused. In the example above, the last 78 bytes of the block would be unused. When a disk uses a large block size such as 4096, up to 4095 bytes of data can be unused. Although this unused space may be a negligible amount on a disk drive that has multi-write capability and that can store millions of bytes, it may be a significant amount on a storage device without multi-write capability and without the capacity to store millions of bytes of data.

The FEProm, in contrast to typical storage devices, is byte addressable, rather than block addressable. It would be desirable to have a file system that would support the byte addressability of an FEProm.

An FEProm can also be organized in a block-erasable format. A block-erasable FEProm contains a number of blocks, typically 16, that can be independently erased. For example, FIG. 3 shows a schematic diagram of a block-erasable FEProm 301 with 16 blocks, numbered 0 to 15. Each one of the blocks can be independently erased without affecting the contents of the other blocks. Block numeral 14 302 can be erased without affecting the data in the other blocks. It would be desirable to have a file system that would support the block-erasable FEProm.

DISCLOSURE OF THE INVENTION

It is an object of the present invention to provide a method of storing data on a file storage device and, in particular, a block-erasable, flash-erasable, programmable, read-only memory.

It is another object of the present invention to provide a computer memory manager for allocating and deallocating memory in a block-erasable FEProm.

It is another object of the present invention to provide a method for tracking the number of times a block has been erased in a block-erasable FEProm.

It is another object of the present invention to provide a block-erasable FEProm with a data structure that facilitates memory allocation.

It is another object of the present invention to provide a method of allocating a block for the storage of data.

It is another object of the present invention to provide a method of reclaiming deallocated space in a block-erasable FEProm.

It is another object of the present invention to provide a file system for a block-erasable FEProm.

These and other objects, which will become apparent as the invention is more fully described below, are obtained by a method and system for managing memory in a block-erasable, flash-erasable, programmable, read-only memory. In a preferred embodiment, the system comprises a block-erasable FEProm with a block header, a block allocation table, a data storage area, a block allocation routine for selecting a block in which to store data, a data area allocation routine for selecting an entry in the block allocation table and a portion of the data storage area, and a storage routine for storing the data. In preferred embodiments, the system includes a file manager to implement a file system for the block-erasable FEProm.

DETAILED DESCRIPTION OF THE INVENTION

In a preferred embodiment, the present invention provides a method and system for the memory management of a block-erasable FEProm. The system is described as an FEProm manager and a file system. The FEProm manager manages memory allocation and deallocation of the FEProm. The file system is a hierarchical directory system and uses the FEProm manager to allocate and deallocate memory. Alternatively, the FEProm manager and file system can be integrated to achieve certain optimizations. However, the use of a distinct FEProm manager allows an FEProm to store data from different file systems and even non-file system data.

FEProm Manager

Figure 22:
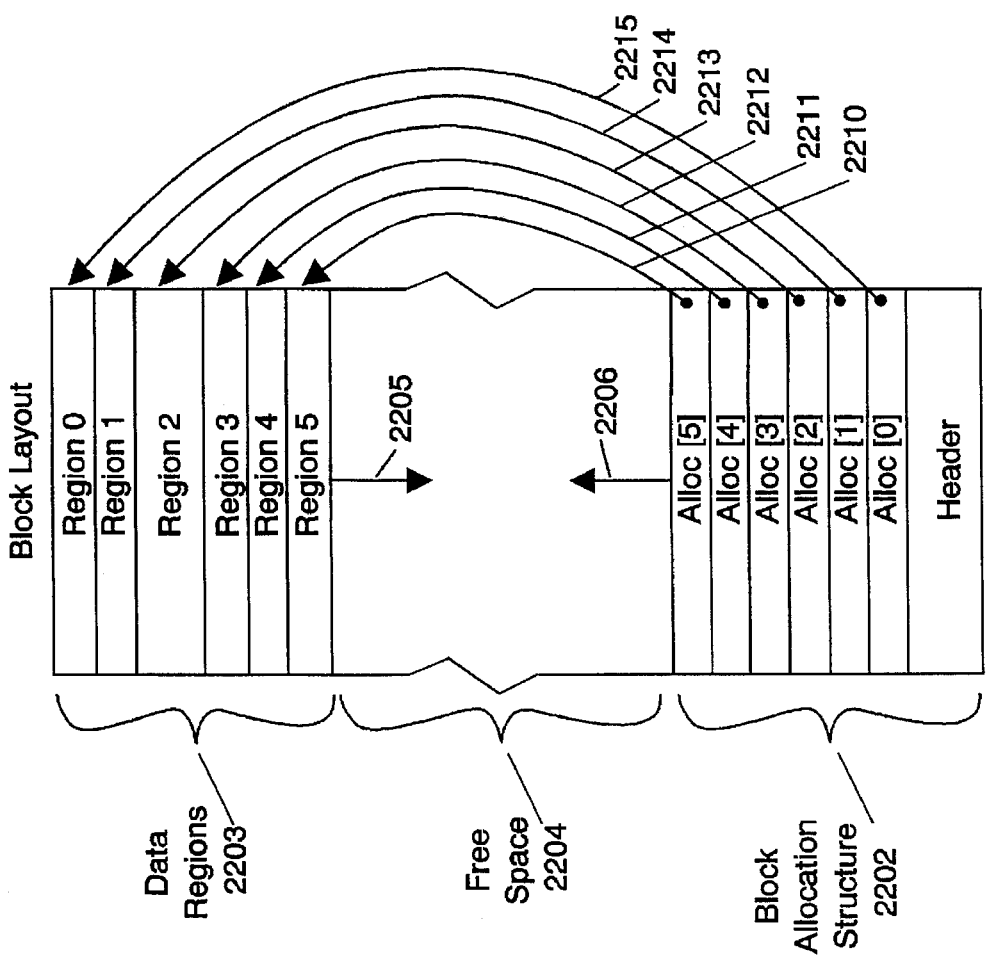
FIG. 22 shows the layout of a block in a preferred embodiment.

The FEProm manager of the present invention provides for allocation of free space, deallocation of allocated space, and reclamation of deallocated space in a block-eraseable FEProm. In preferred embodiments, as shown in FIG. 22, each block of the FEProm contains a block allocation structure 2202, data regions 2203, and free space 2204. The block allocation structure 2202 contains a header and an allocation array. The header is a fixed-length structure that contains status information for the block. The allocation array is variable length; the entries of the allocation array describe the data regions. Table A shows the data structure of the Block Allocation Structure. The structure is shown in the C programming language format along with a description of the structure variables. The array Alloc is the allocation array and the other variables compose the header. The data regions are variable-length regions that hold the data stored in the FEProm. The free space 2204 is space that is not allocated to the block allocation structure or the data regions. The block allocation structure 2202 and the data regions 2203 are located at opposite ends of the block. As regions are added, the block allocation structure 2202 and the data region grow towards each other as indicated by arrows 2205 and 2206. The Alloc entries in the block allocation structure contain offsets 2210-2215 to the corresponding region in the block. In a preferred embodiment, the block allocation structure contains data that is specific to the data stored in the regions.

TABLE A

Data Structure struct BlockAllocation
{
    struct
    {
        byte    Status;
        byte    Offset[3];
        word    Len;
    }    Alloc[ ];
    dword    BootRecordPtr;
    dword    EraseCount;
    word    BlockSeq;
    word    BlockSeqChecksum;
    word    Status;
}

Definitions

| | |
|---|---|
| Alloc | variable length array structure that defines the regions within the block |

TABLE A-continued

| | | |
|---|---|---|
| Status bit # | | status of region |
| 5-2 | 1111 | Unused |
| | 1011 | Intermediate state |
| | 0111 | Free |
| | 0011 | Allocated |
| | 0001 | Deallocated |
| | 0010 | Superseded |
| | 0000 | Null |
| 7-6 | 11 | unused entry |
| | 10 | last entry |
| | 00 | not last entry |
| Offset | | offset, relative to the beginning of the block, of this region |
| Len | | length, in bytes, of region |
| BootRecordPtr | | handle to boot record when the FEProm is used as a file storage device |
| EraseCount | | number of times the block has been erased |
| BlockSeq | | logical sequence of block within the FEProm |
| BlockSeqChecksum | | checksum of block sequence number |
| Status bit # | | |
| 1-0 | 11 | boot record not in block (when the FEProm contains file system data) |
| | 10 | boot record in block |
| | 00 | boot record superseded |
| 15-10 | 110000 | Ready |
| | 0XXXXX | QueuedForErasure |
| | 111111 | Erased |
| | 111110 | UpdateInProcess |
| | 111100 | Spare Block |
| | 111000 | ReclamationInProcess |
| | 000000 | Retired |

The FEProm manager allocates a data region in a block by adding an Alloc entry, setting the variable Offset to point to the first location in free space, setting the variable Len to the length of the region, and setting the variable Status to indicate allocated. The FEProm manager deallocates a region by setting the variable Status in the corresponding Alloc entry to deallocated. Deallocated space is generally not available for reallocation because it may have been set to a non-FNULL value. Deallocated space is set to FNULLs before it is reallocated. The process of setting the deallocated space to FNULLs and making it available for allocation is block reclamation. Deallocated space is reclaimed by copying the allocated regions to second block and setting the Alloc entries in the second block to point to the new offsets. The block reclamation process ensures that the Alloc entries in the second block are in the same position relative to the block header as they were in the copied-from block. The FEProm manager uses a logical block sequence number, variable BlockSeq in the header, to identify a specific logical block of data. As a block is copied during reclamation, the physical block number will change but the logical block sequence number does not change.

Figure 25:
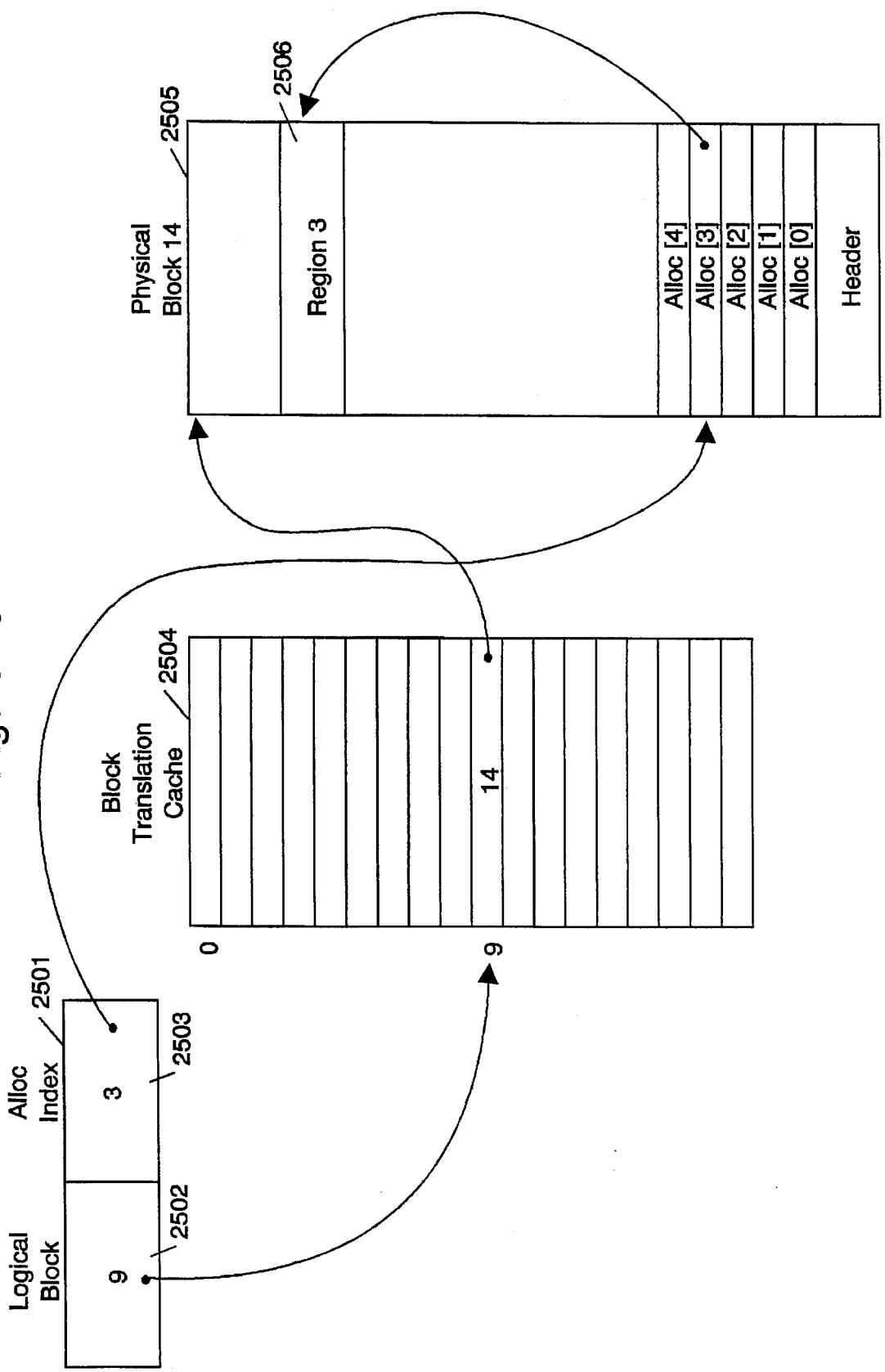
FIG. 25 shows the dereferencing of a handle.

The FEProm manager provides a handle to the allocated region rather than the address of the start of the region. The handle contains two parts: (1) a logical block sequence number, which indirectly references a physical block, and (2) an index to an Alloc entry, which indirectly references a region within the physical block. A handle is dereferenced by determining the physical block that corresponds to the logical block sequence number and by accessing the variable Offset in the Alloc entry that is indexed by the index part of the handle, and adding the variable Offset to the starting address of the physical block. This dereferencing produces the address of the region. The use of handles allows the FEProm manager to reclaim a block without adjusting the links to the data regions that may exist. All that needs to be updated is a translation cache (explained below), which resides in memory and maps the logical block sequence numbers to physical blocks, and the offsets in the Alloc array. When a handle is dereferenced, the new offset is used to produce the correct address. FIG. 25 shows the dereferencing of a handle 2501, which has a logical block sequence number 2502 of 9 and an Alloc index 2503 of 3. The block translation cache 2504 maps logical block numbers to physical block numbers. The FEProm manager maintains the cache. When one physical block is moved to another physical block during block reclamation, the FEProm manager adjusts the translation cache to map the logical block sequence number to the new physical block. In the example of FIG. 25, the logical block sequence number 9 maps to physical block 14 2505. The Alloc array for physical block number 14 is indexed by the Alloc index 2503 of the handle 2501. The variable Offset of the Alloc[3] entry contains the offset of region 3 2506 in physical block number 14 2505. The address of region 3 2506 is determined by adding the offset to the address of physical block 2505.

Figure 7:
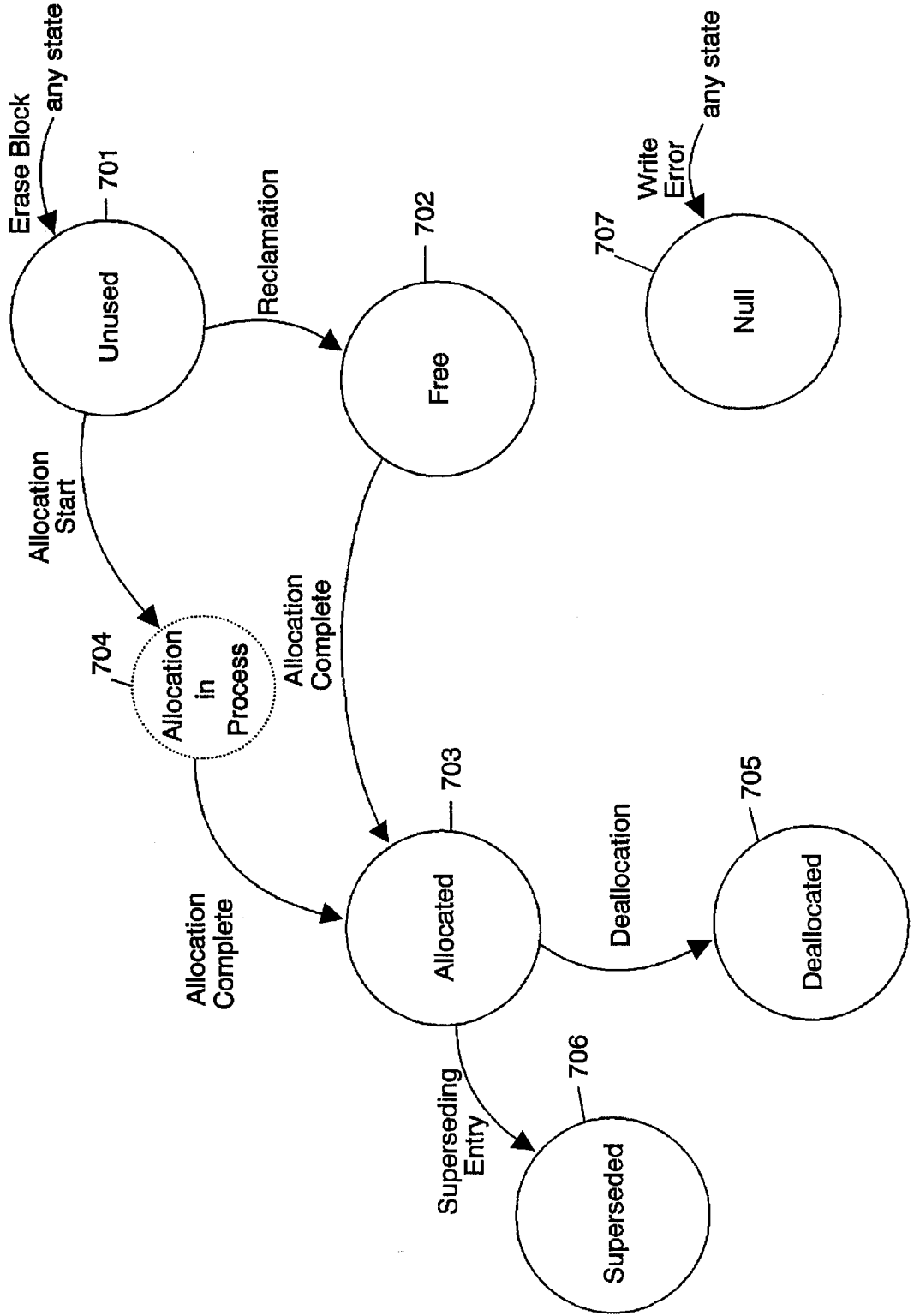
FIG. 7 is a state diagram of the states of the Alloc entries.
Figure 29:
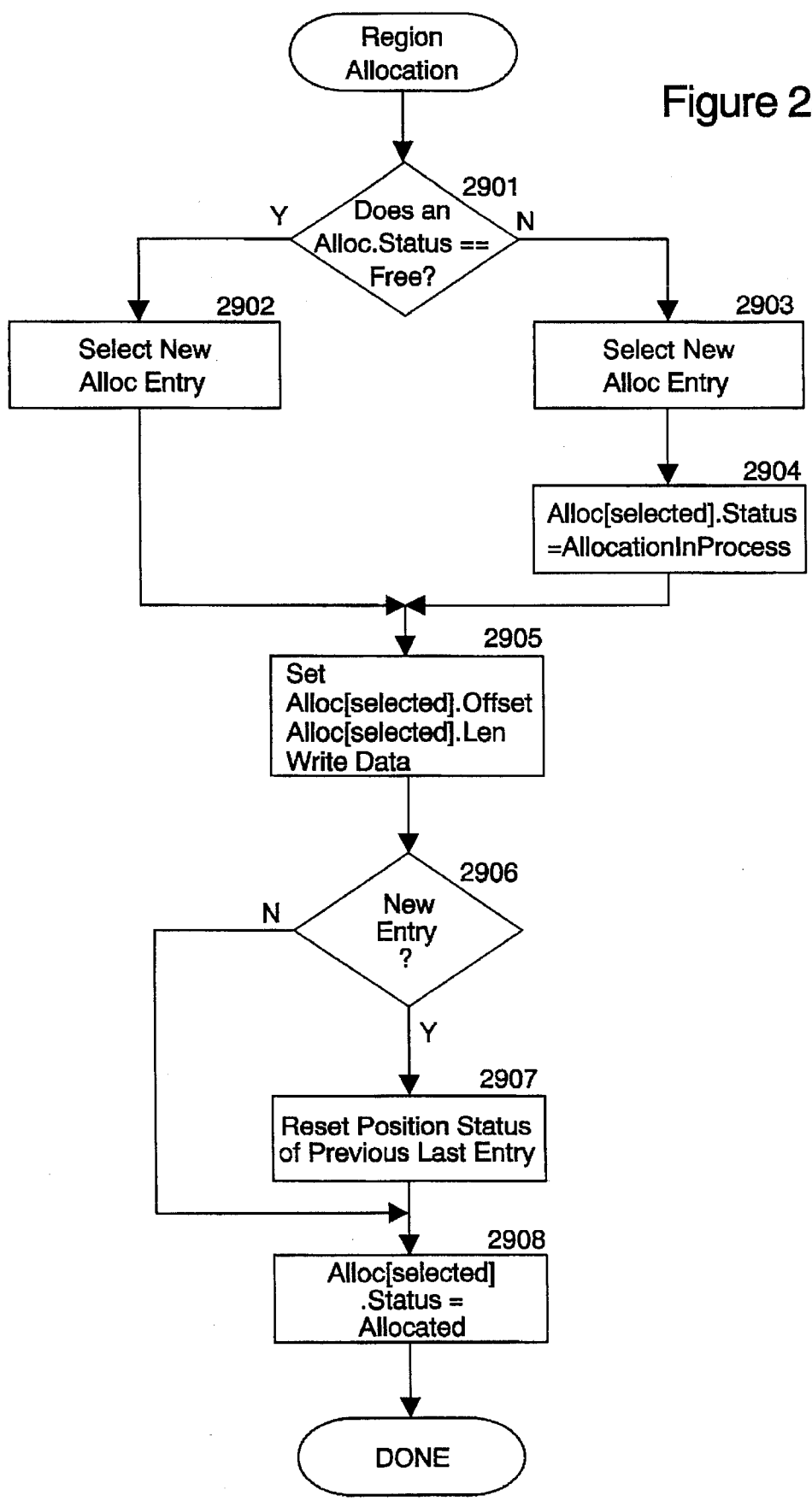
FIG. 29 is a flow diagram of the Region Allocation routine in a preferred embodiment.

FIG. 29 is a flow diagram of the Region Allocation routine that allocates a new region within a block. The input parameters to this routine are the data to store in the region and length of the data. The routine returns the handle to the allocated region. Alternatively, this routine would not write the data, but just allocate space. The routine assumes that the block has sufficient free space for the region and an additional Alloc entry. FIG. 7 is a state diagram for the states of an Alloc entry. An Alloc entry can be in one of the following states: unused, allocated, deallocated, superseded, free, or null. The entry is also in a transitional state while allocation is in process. If an entry is unused, then it is past the last entry in the Alloc array, that is, it is not part of the array. If the entry is allocated, then the corresponding region is currently allocated. If the entry is deallocated, then the corresponding region is not needed, but the region has not yet been reclaimed. If an entry is superseded, then another Alloc entry(ies) corresponds to the same data region. During reclamation, the data in a superseded entry is ignored because another entry(ies) points to the data region. If the entry is free, then the corresponding region has been reclaimed and the Alloc entry can be reused when a new region is added to the block. If an entry is null, then a problem occurred during writing to the entry and it is not used until erased. If the entry is in the allocation in process transitional state, then some of the data in the entry may be valid but not necessarily all.

Referring to FIG. 7, all entries are initially in the unused state 3101 and transition to the unused state 701 whenever the block is erased. An entry transitions from the unused state 701 to the allocated state 703 through the allocation in process state 704. An entry in the free state 3102 transitions to the allocated state 703. An entry in the unused state 701 transitions to the free state 702 as a result of a block reclamation when that entry was deallocated or superseded and not located after the last allocated entry in the block to be reclaimed. An entry in the allocated state 703 transitions to the deallocated state 705 when the corresponding region is deallocated. An entry in the allocated state 705 transitions to the superseded state 706 when another entry or entries are allocated that correspond to the same region. Finally, an entry in any state transitions to the null state 707 on a write error to the entry.

Referring to FIG. 29, in block 2901, the system determines whether an Alloc entry has a status of free. If such an entry is found, then the system will reuse that entry and continues a block 2902, else the system continues at block 2903. In block 2902, the system selects the free Alloc entry and continues at block 2905. In block 2903, the system allocates and selects a new Alloc entry and continues in block 2904. The new Alloc entry is the entry just after the entry marked last. In block 2904, the system sets the variable Status for the selected Alloc entry to indicate that allocation is in process. The allocation in process state is a transitional state that indicates that the data may be in an inconsistent state. In block 2905, the system sets the variables Offset and Len and writes the data to a data region starting at the first location in free space. In block 2906, if the Alloc entry was new, then the system continues at block 2907, else the system continues at block 2908. In block 2907, the system resets the Status of the previous last Alloc entry to indicate that it is no longer the last entry in the Alloc structure. In block 2908, the system sets the variable Status for the selected Alloc entry to allocated, which indicates that the data is now in a consistent state. The system is then done with the allocation.

As discussed above, performance of a block of an FEProm degrades as the erase count increases. It is preferred to keep the erase count for each of the blocks approximately equal, referred to as "leveled." In normal operation, the erase counts will not be leveled. For example, if executable files are written to a block, there may never be a need to erase that block. Thus, the erase count for that block will remain constant as the erase count for other blocks increases. A preferred embodiment uses several approaches to level the block erase counts. First, during boot-up or whenever an FEProm is loaded (initialization), the FEProm manager scans the blocks to obtain data to manage the FEProm. In a preferred embodiment, this data includes the erase count for each block. To help level the erase counts, the FEProm manager swaps the data in a block with a high erase count with the data in a block with a low erase count. Because this swapping may be time consuming, it is desirable to minimize the number of swaps that occur during initialization. Moreover, the swapping need only be performed when the difference between erase counts exceeds a threshold value or ratio. Second, whenever the FEProm manager performs a reclamation on a block, it preferably selects an available block with a low erase count. Third, whenever the FEProm manager allocates a region, it allocates the region in a block with a low erase count. Fourth, the FEProm manager tracks the number of block erasures. If the number of erasures exceeds a threshold value, the FEProm manager determines whether the difference in erase counts for any two blocks exceeds the threshold value or ratio. If the threshold is exceeded, the manager swaps the data in the blocks.

The FEProm manager preferably maintains the erase count in the header of each physical block. Whenever a block is erased, the FEProm manager writes the incremented erase count back into the block header. Whenever a block is copied, the erase count is not transferred. Each block retains its own erase count. Alternatively, the erase counts could be stored in a single block. However, this alternate method has a couple disadvantages over the preferred method. First, all erase counts could be lost by a single block failure. Second, when a block is erased, the erase count block must be updated. Eventually, the erase count block must be erased and rewritten.

Figure 28:
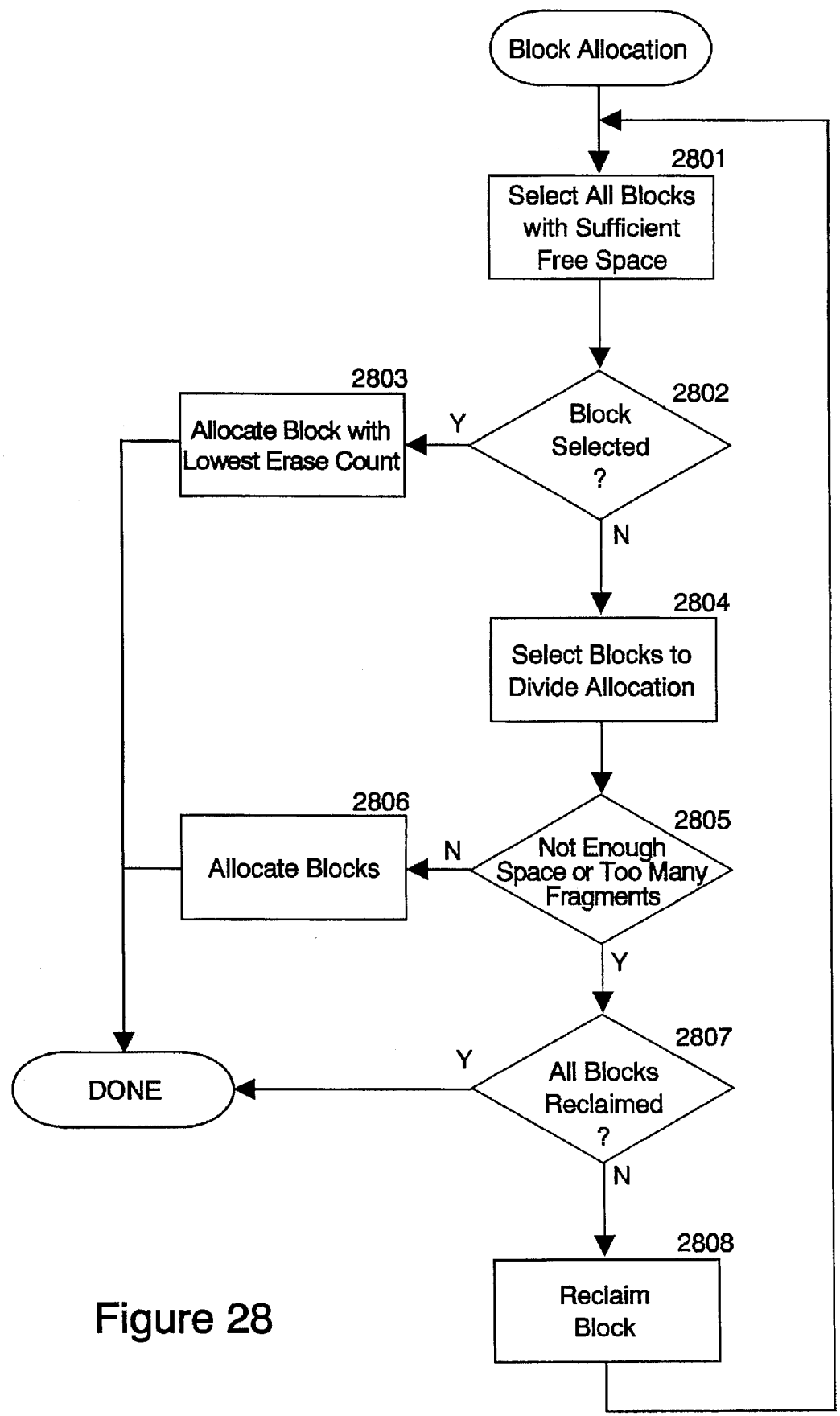
FIG. 28 is a flow diagram of the Block Allocation routine in a preferred embodiment.

FIG. 28 is a flow diagram of the Block Allocation routine that selects which of the blocks in the block-erasable FEProm is to be used to allocate a region. The FEProm manager determines which block to allocate based on several factors. First, the FEProm manager allocates the block with enough free space that has the lowest erase count. Allocating blocks with low erase counts will help ensure that the blocks are leveled. Second, the FEProm manager allocates multiple blocks if there is no block with sufficient free space. The data is divided into several regions each of which is stored in a different block. Third, the FEProm manager will not permit allocation when too many fragments will result. The input parameters to this routine are the length of the region to be allocated and whether the region can be stored in multiple blocks. In block 2801, the system selects all blocks with sufficient free space to store the data. In a preferred embodiment, the system determines the length of the free space based on the location of the start of free space and the number of Alloc entries. This data is preferably stored in an FEProm manager buffer during initialization and updated as needed. The system also ensures that there is sufficient space to add a new Alloc entry, if necessary. In one embodiment, the system performs a block reclamation for those blocks that meet the reclamation criteria before determining if the block has sufficient free space. In an alternate embodiment, no reclamation occurs until it is determined that there is not sufficient free space. In block 2802, if at least one block was selected, then there is enough free space in a single block to hold the region and the system continues at block 2803, else the system continues at block 2804. In block 2803, the system determines which of the selected blocks have the lowest erase count and allocates that block and the system is done with the block allocation. In block 2804, the system selects a set of blocks that has enough free space to hold the region data. In block 2805, if the total free space and deallocated space is not sufficient to hold the data or there would be too many fragments, the system continues at block 2807, else the system continues at block 2806. If the region data must be stored in a single block, then selecting two blocks is too many fragments. Also, if the data is to be stored in several blocks, then a reclamation may be appropriate. In block 2806, the system allocates the selected blocks and the block allocation is done. In block 2807, if all the blocks have been reclaimed, then there is insufficient room on the FEProm to store the data and the block allocation is done, else the system continues at block 2808. In block 2808, the system reclaims a block and loops to block 2801 to determine if there is now enough free space.

Figure 23:
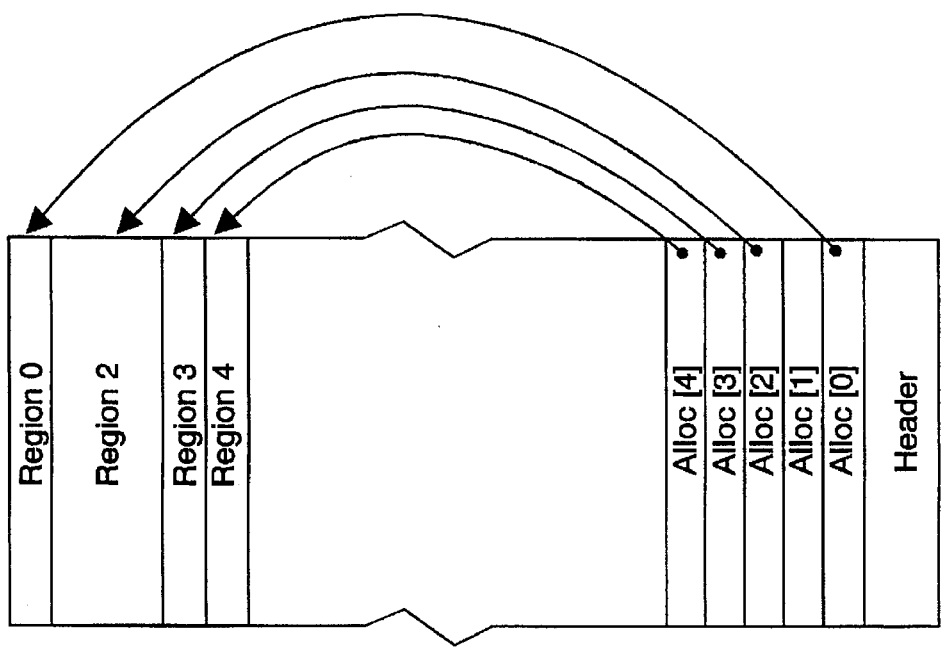
FIG. 23 shows the layout of the block in FIG. 22 after reclamation in a preferred embodiment.
Figure 30:
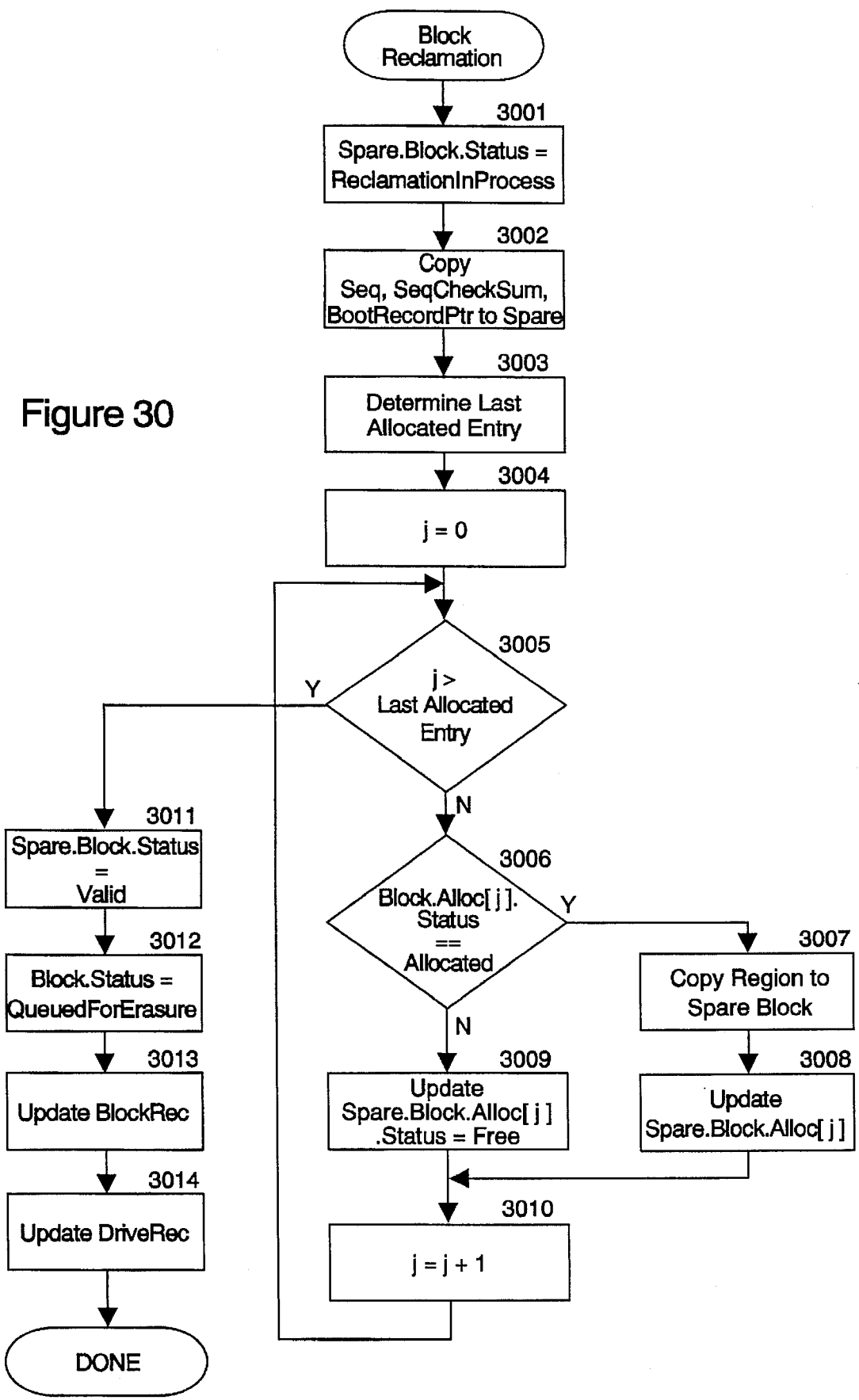
FIG. 30 is a flow diagram of the Block Reclamation routine in a preferred embodiment.

FIG. 30 is a flow diagram of the Block Reclamation routine, which reclaims the deallocated regions in a block. The input parameters are the number of the block to be reclaimed and the physical number of a spare block. A block may be reclaimed at several different times. First, a block may be reclaimed (as discussed above) when there is insufficient free space to satisfy an allocation request. Second, the FEProm manager can track the number of write accesses to the FEProm. If the number of writes exceeds a threshold number, then the manager determines whether any blocks should be reclaimed. A block should be reclaimed when the ratio of deallocated space to block size exceeds a threshold value. One skilled in the art would appreciate that block reclamation can occur at other times, such as when an FEProm is first loaded. The FEProm manager reclaims a block by copying the allocated regions to a spare block, a block that has been erased. By copying only the allocated regions, the deallocated regions are reclaimed. Alternatively, the FEProm manager could copy the allocated regions to non-FEProm memory, then erase the block, and copy the regions back to the block. However, this method requires enough non-FEProm memory to store the allocated regions and has the potential to lose data should a power failure occur after erasure but before the block is rewritten. In the preferred method, the FEProm manager copies the allocated regions in the block to be reclaimed to the spare block and copies the Block Allocation Structure adjusting the variable Offset to reflect the new region locations in the spare block. FIG. 23 show an example of the block layout of FIG. 22 after regions 1 and 5 are reclaimed. The allocated regions have been copied to be contiguous. The corresponding Alloc entries are update to point to the new region locations. The Alloc[1] entry is still needed even though region 1 has been reclaimed. Because of the use of handles, all the Alloc entries must maintain their same position in the Block Allocation Structure. However, the variable Status for the Alloc[1] entry is set to free, and it can be used to point to the next region that is added to the reclaimed block. Since there were no Alloc entries after the Alloc[5] entry, it was not needed as a placeholder for any handles, and it was removed. The position status of Alloc[4] entry indicates that it is the last entry in the Alloc array.

Figure 9:
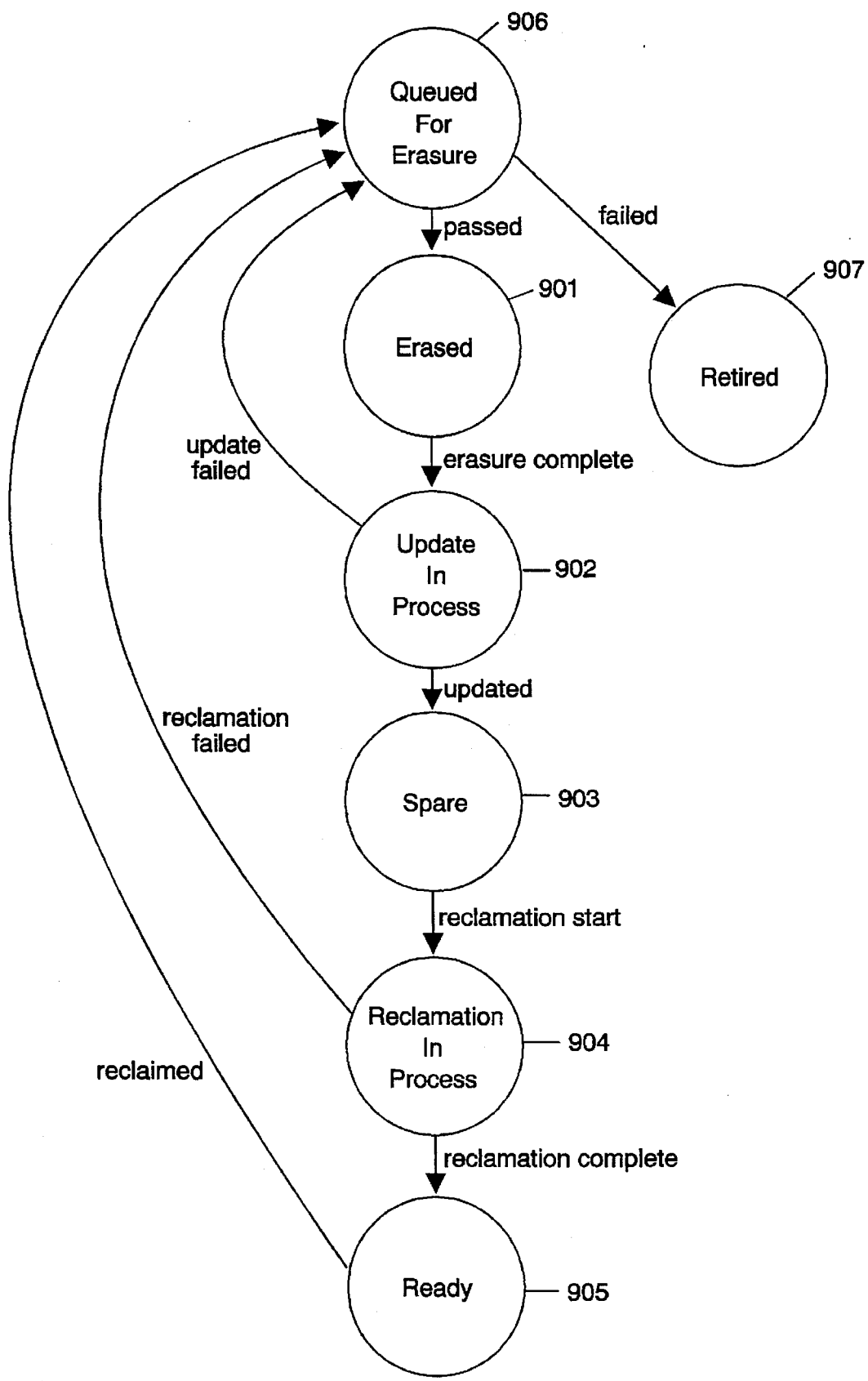
FIG. 9 is a state diagram of the states of the blocks.

FIG. 9 is a state diagram for the state of a block. The state of a block is stored in the header in variable Status. The states of a block are erased 901, update in process 902, spare 903, reclamation in process 904, ready 905, queued for erasure 906, and retired 907. A newly erased block is in the erased state 901. An erased block normally transitions to the update in process state 902 and then to the spare state 903. The update in process state 902 indicates that certain data in the header such as erase count is being updated. Once this update is complete, the block transitions to the spare state 903. If the update fails, the block transitions to the queued for erasure state 906. A block in the spare state 903 transitions to the reclamation in process state 904 when the block is to receive the data from a block being reclaimed. The reclamation in process state 904 is a transitional state that indicates that the block allocation structure may not be in a consistent state. Once the data is consistent, the block transitions to the ready state 905. If, however, an error occurs while in the reclamation in process state 905, the block transitions to the queued for erasure state 906 after a reclamation has occurred for that block. A block in the queued for erasure state 906, transitions to the erased state 901 when erased. If the erase fails, the block transitions to the retired state 907. The block stays in the retired state forever. When an FEProm is first initialized, the blocks are set to either the ready state or the spare state. Blocks in the ready state can contain data; blocks in the spare state do not contain data.

Referring to FIG. 30, in block 3001, the system sets the variable Status for the spare block to be reclaimed to indicate that reclamation is in process. In block 3002, the system copies the variables Seq, SeqCheckSum, and BootRecordPtr from the header of the block to be reclaimed to the spare block. In block 3003, the system determines the position of the last Alloc entry in the allocated state for the block to be reclaimed. During the reclamation process, the Alloc entries after the last allocated entry are ignored. Thus, the reclaimed block will have the states of those entries set to unused. In blocks 3004 through 3010, the system copies each Alloc entry up to the last allocated entry to the spare block. In block 3004, the system initializes index j, which indexes the Alloc entries. In block 3005, if index j is greater than the index of the last allocated entry as determined in block 3003, then all the Alloc entries and corresponding regions have been copied and the system continues at block 3011, else the system continues at block 3006. In block 3006, if the state of the entry is allocated, then the system continues at block 3007, else the system continues at block 3009. In block 3007, the system copies the region data corresponding to the Alloc[j] entry to the spare block. In block 3008, the system updates the variable Offset in the Alloc[j] entry of the spare block to indicate the location of the copied region and copies the variables Status (setting the position status as appropriate) and Len and continues at block 3010. In block 3009, the system updates the state of the Alloc[j] entry of the spare block to indicate that the entry is free. In block 3010, the system increments index j to index the next Alloc entry and loops to block 3005. In block 3011, the system sets the state of the spare block to ready. In block 3012, the system sets the state of the block to be reclaimed to queued for erasure. After the processing for block 3011 is complete but before the processing for block 3012 is complete both the spare block and the block to be reclaimed have valid data. If processing is interrupted before the processing for block 3012 completes, then the FEProm will contain two blocks with the same logical sequence number. The system preferably checks for this condition during initialization of the FEProm. At that time, the system can complete the processing of block 3012. In block 3013, the system updates the variables PhysicalBlockNum, FirstFreeByteOffset, LenDeallocatedSpace, and AllocStructCnt in BlockData [Seq] to reflect the state of the spare block (described below). In block 3014, the system updates the DriveRec to adjust the list of spare blocks and the reclamation is done (described below).

TABLE B

Data Structures

| | | |
|---|---|---|
| struct | | DriveRec |
| { | word | BlockCnt |
| | word | SpareBlockCnt |
| | dword | BlockSize |
| | word | RootDirPtr |
| | word | SpareBlockPtr[ ] |
| } | | |
| struct | | ConfigRec |
| { | word | WriteAccessCntThreshold |
| | word | EraseCntThreshold |
| | word | BlockReclamationThreshold |
| | word | BlockEraseLevelingThreshold |
| } | | |
| struct | | BlockRec |
| { | byte | Flags |
| | word | PhysicalBlockNum |
| | dword | FirstFreeByteOffset |
| | dword | LenDeallocatedSpace |
| | word | AllocStructCnt |
| | dword | BlockEraseCnt |
| | word | FirstUseableAllocEntry |
| | word | FreeAllocEntryCnt |
| } | | BlockData[ ] |

Definitions

| | |
|---|---|
| BlockCnt | number of physical blocks in the FEProm |
| BlockSize | number of bytes in a block |
| RootDirPtr | handle to the data region that contains the root directory when the FEProm is used as a file storage device |
| SpareBlockPtr[ ] | variable-length array that contains the physical block numbers of the spare blocks |
| SpareBlockCnt | number of spare blocks |

TABLE B-continued

| | |
|---|---|
| WriteAccessCntThreshold | number of writes to the FEProm that will cause the system to determine if any blocks should be reclaimed |
| EraseCntThreshold | number of erases to the FEProm that will cause the system to determine if block leveling should occur |
| BlockReclamationThreshold | ratio of deallocated space to block size that triggers block reclamation |
| BlockEraseLevelingThreshold | difference between minimum and maximum erase counts that will trigger the leveling process between the blocks |
| PhysicalBlockNum | physical block number that the contains the logical block |
| FirstFreeByteOffset | offset in the physical block of the first byte of free space |
| LenDeallocatedSpace | total length of the deallocated regions in the physical block |
| FirstUseableAllocEntry | index of first useable Alloc entry in block |
| FreeAllocEntrycnt | number of free Alloc entries in block |
| AllocStructCnt | number of Alloc entries |
| BlockEraseCnt | number of times the physical block was erased |

Figure 27:
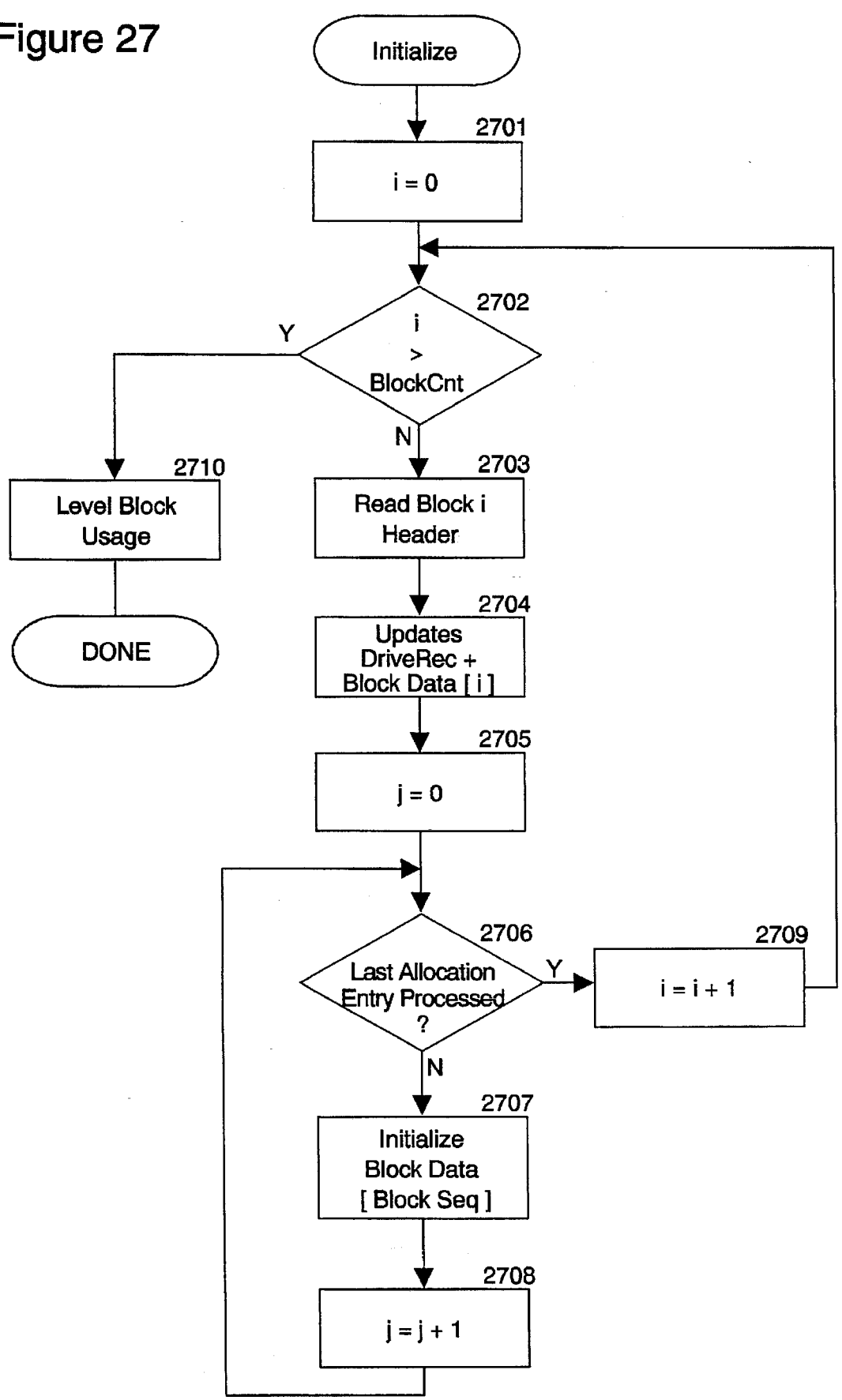
FIG. 27 is a flow diagram of the initialization process in a preferred embodiment.

When an FEProm is first loaded, the FEProm manager scans the FEProm to initialize internal data structures shown in Table B. The structure DriveRec contains data relating to the device, the structure ConfigRec contains data relating to configuration parameters, and the array BlockData contains an entry with data for each physical block in the FEProm. The array BlockData is the block translation cache. During initialization, the FEProm manager initializes each of the variables in array BlockData and the variables relating to spare blocks in the structure DriveRec. The other variables in the struct DriveRec are system defined variables. In a preferred embodiment, the FEProm manager stores information that is specific for the type of region data in these data structures. For example, if the FEProm is used as a file storage device, the data structures may contain the handle to the root directory. FIG. 27 is a flow diagram of the initialization process in a preferred embodiment. This procedure initializes the DriveRec and the BlockData structures by scanning the block allocation structure for each block on the FEProm. In blocks 2701 through 2709, the system loops reading data from each block. In block 2701, the system initializes index i, which indexes the physical block currently being accessed. In block 2702, if index i is greater than the number of blocks in the FEProm, then all blocks have been scanned and the system continues at block 2710, else the system continues at block 2703. In block 2703, the system reads the header for the block indexed by index i. In block 2704, the system updates the DriveRec and BlockData [i] data. If the block is a spare block, then the system increments SpareBlockCnt and adds the block to the SpareBlockPtr array. In a preferred embodiment, the system also scans for information that is specific for the data stored in the regions. For example, if the FEProm is used as a file system then if the block contains the boot record, the system sets the BootRecPtr, reads the boot record, and sets the RootDirPtr. In blocks 2705 through 2708, the system loops processing the data in each Alloc entry. In block 2705, the system initializes index j, which indexes the Alloc entries. In block 2706, if the system has processed the last Alloc entry, then the system continues at block 2709, else the system continues at block 2707. In block 2707, the system updates the BlockData[BlockSeq] data based on the Alloc entry indexed by j. The system updates the variables FirstFreeByteOffset, LenDeallocatedSpace, and AllocStructCnt. The system sets the variable Physical BlockNum to index i, which initializes the translation cache. In block 2708, the system increments index j to index the next Alloc entry and loops to block 2706. In block 2709, the system increment index i to index the next block in the FEProm and loops to block 2702. In block 2710, the system then levels the block usage. The system scans the BlockData array to determine the block with the maximum BlockEraseCnt and the block with the minimum BlockEraseCnt. The system then swaps the data between the blocks. The system first copies the maximum block to a spare block. The system then erases the maximum block. The system copies the data from the minimum block to the erased block and preferably performs a block reclamation while copying. The system erases the minimum block and copies the data from the spare block to the minimum block and preferably performs a block reclamation while copying.

The FEProm manager of the present invention can support media that is not blocked or that is not erasable. The block reclamation and block erase count leveling processes rely on block-erasability. Thus, these processes should be disabled if the media does not support block erasability. In a preferred embodiment, these processes can be effectively disabled by setting the spare block count to 0. The FEProm manager relies on at least one spare block to activate these processes. If the media is not blocked, an arbitrary block size can be selected as a logical block. In a preferred embodiment, the size of the block should not be so large that the offset in the allocation array entries cannot address the entire block and should not be so small that the block header and allocation array comprise an appreciable percent of the block size or that the translation cache is too large.

The FEProm manager allows for dynamic recovery from FEProm write and erase errors. A write error is generated whenever a memory location cannot be set to the value specified. These errors can be caused either by failure of the hardware or by trying to write a value to a memory location that requires a 1 in a certain bit which already has a been changed to a 0.

Write errors can occur while writing to a data region, a block header, and an allocation array entry. In a preferred embodiment, when a write error occurs while writing to a data region, the FEProm manager sets the block to the deallocated state. The FEProm manager then tries to write the data to a different data region by restarting the region allocation process as shown in FIG. 29.

When a write error occurs while writing to an allocation array entry, the FEProm manager sets the allocation array entry to the null state. If the error occurred while setting an entry to the superseded, deallocated, free, or allocation in process state, then the setting of the entry to the null state will leave the FEProm in a consistent state. However, if the error occurred while setting an entry to the allocated state, then the FEProm will be in an inconsistent state because the data region has no corresponding allocation array entry that is in the allocated state. The FEProm manager allocates another entry for the data region. An error may also occur while setting an entry to the null state. Since the null state is defined as a status value of 0s, then an error when setting an entry to the null state is necessarily a hardware error. If an error occurs, then a reclamation may be needed that specifies that the corresponding region must be reclaimed. For example, if an error occurs while setting an entry to the deallocated state and again while setting the entry to the null state, then the entry will be in the allocated state. If left in this state, this entry and corresponding data region would never be reclaimed under normal reclamation.

When an error occurs while writing to a block header, then the FEProm manager sets the block to the queued-for-erasure state. If an error occurs while setting a block to the queue-for-erase state, the FEProm manager sets the block to the retired state. If an error occurs while setting a block to the retired state, then the error may be unrecoverable.

When a write error occurs while erasing a block, the FEProm manager sets the block to the retired state. If the retired block was a spare block, then the FEProm manager operates with fewer spare blocks. Alternatively, the FEProm manager attempts to locate a block with no allocation array entries that are allocated. The FEProm manager then erases the located block and sets it to the spare state. Whenever no spare blocks are available, then the FEProm manager treats the FEProm as if it were not erasable as discussed above.

The present invention also provides for dynamic error recovery should the FEProm be in an inconsistent state. For example, referring to FIG. 29, if the FEProm is removed after the offset is written in block 2905, but before the status is updated from the free state to the allocated state in block 2908, then the FEProm will be in an inconsistent state. When the FEProm is next loaded, the FEProm manager would see that the allocation entry is free and attempt to reuse it. However, an attempt to write to the offset would fail (unless the same data was being written to the offset). As discussed above, the FEProm manager would recover by setting the entry to the null state and would restart the region allocation process to select a different entry. If a portion of the data is written to the data region before the FEProm is removed, then an error would be detected when the FEProm manager tries to write data over that region. This error would be handled as described above.

File System

The present invention provides a directory-based hierarchical file system for an FEProm device. A hierarchical file system provides for storing files in logical groupings. A preferred embodiment uses a linked-list data structure to implement both the directory hierarchy and the internal file storage.

Figure 1A:
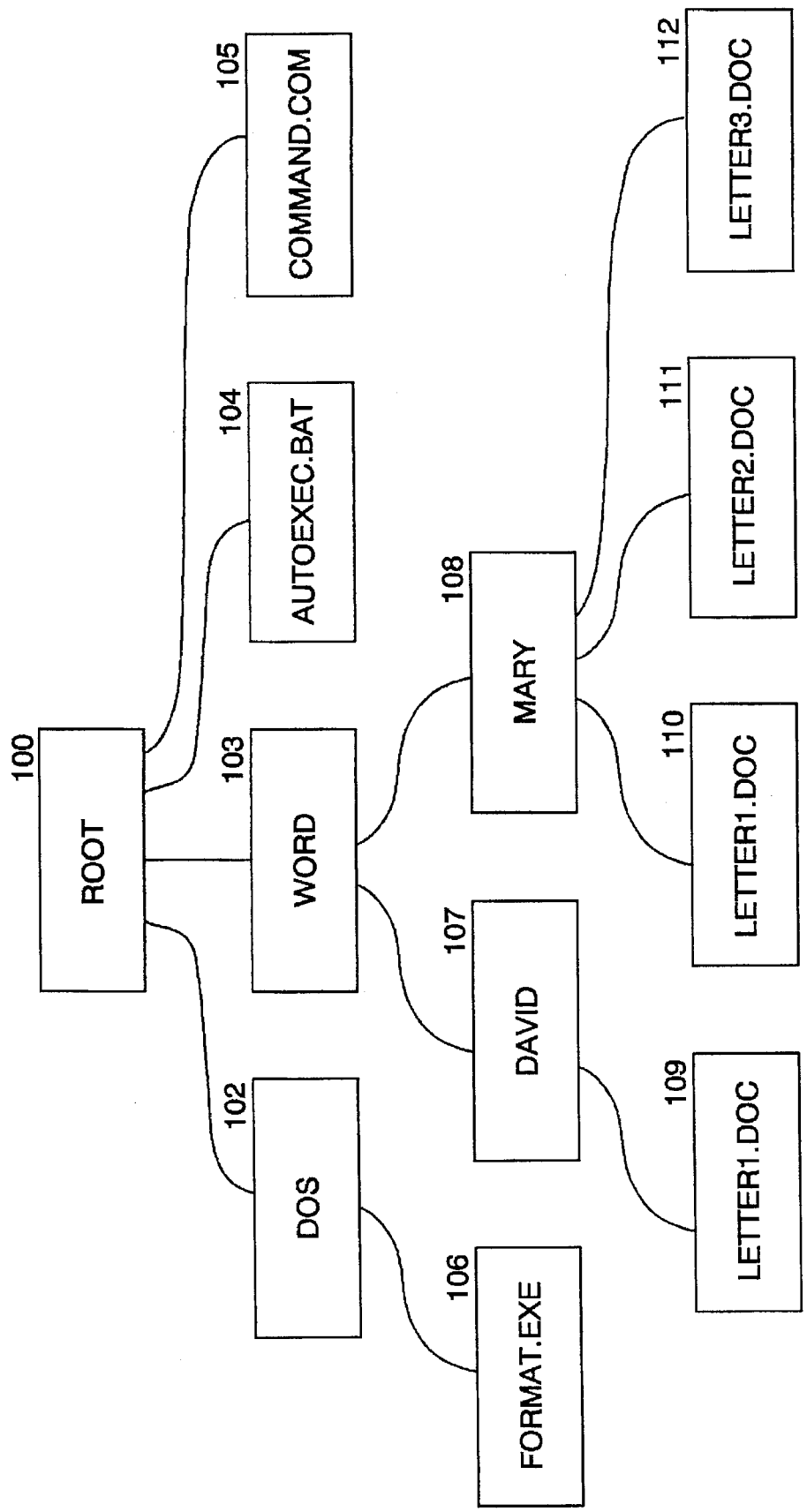
FIG. 1A shows a sample hierarchical or tree-structured organization of directories and files.

FIG. 1A shows a typical hierarchical directory structure. The MS-DOS operating system, which is available from Microsoft Corporation of Redmond, Washington, implements a file system with a hierarchical directory structure. As shown in FIG. 1A, the directory ROOT 100 contains two subdirectories (DOS 102 and WORD 103) and two files (AUTOEXEC.BAT 104 and COMMAND.COM 105). The directory DOS 102 contains one file (FORMAT.EXE 106). The directory WORD 103 contains two subdirectories (DAVID 107 and MARY 108) at the next lower level. The directory DAVID 107 contains one file LETTER1.DOC 109. The directory MARY 108 contains three files LETTER1.DOC 110, LETTER2.DOC 111, and LETTER3.DOC 112.

Figure 1B:
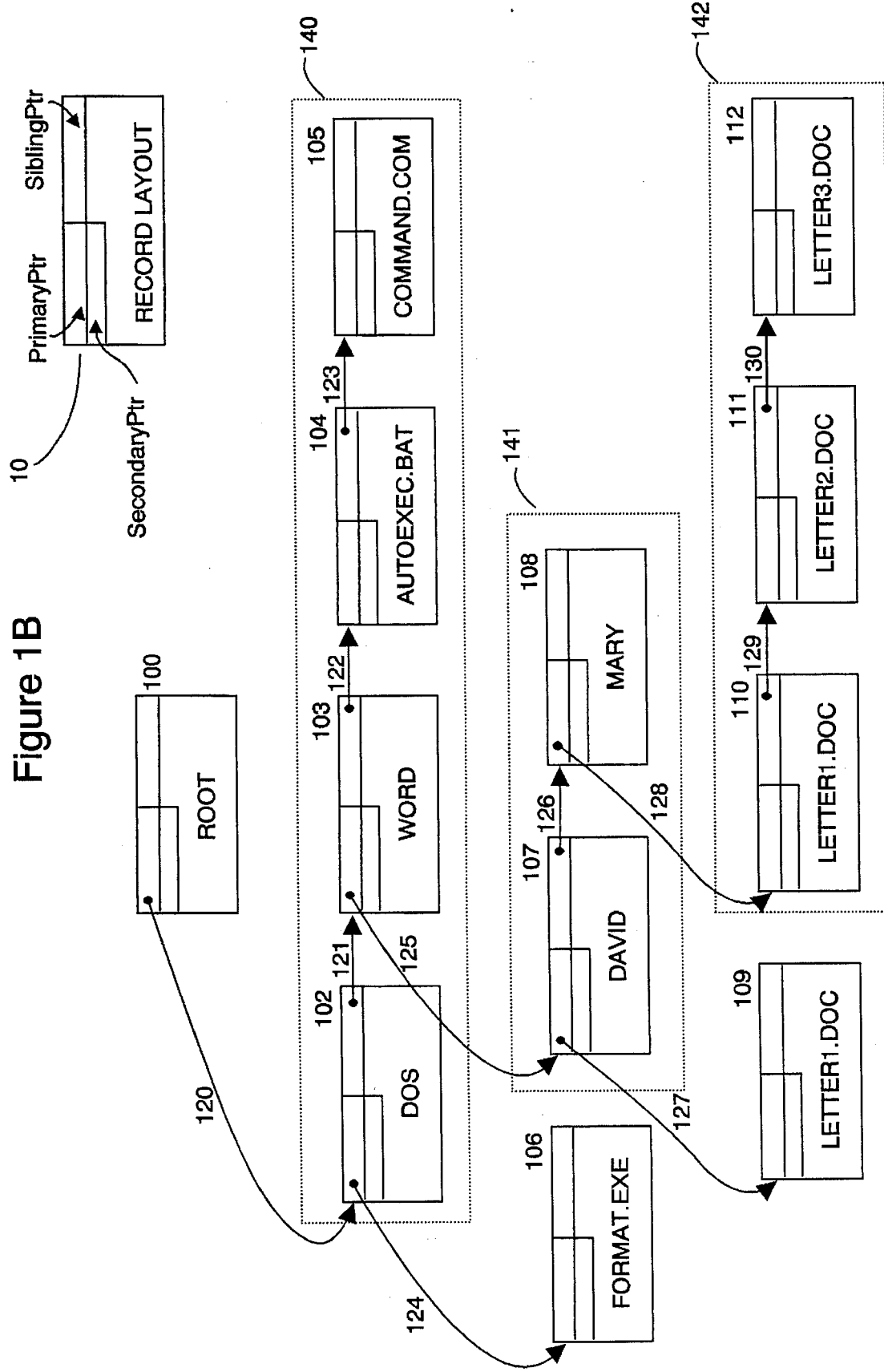
FIG. 1B shows a linked-list structure that represents the same directory structure of FIG. 1A.

FIG. 1B shows a possible linked list that implements the directory structure of FIG. 1A in a preferred embodiment. The directory ROOT record 100 (the terms record and entry are used interchangeably in this specification) has a pointer 120, which points to a linked list 140 of subdirectory and file records at the next lower level. The linked list 140 comprises directory records DOS 102 and WORD 103 and file records AUTOEXEC.BAT 104 and COMMAND.COM 104 linked by pointers 121, 122, 123. The subdirectory record DOS 102 has a pointer 124 to the file record 106 at the next lower level, and the subdirectory record WORD 103 has a pointer 125 to a linked list 141 of subdirectory records at the next lower level. The linked list 141 comprises directory records DAVID 107 and MARY 108 linked by pointer 126. The subdirectory record DAVID 107 has a pointer 127 to the file at the next lower level, and the subdirectory record MARY 108 has a pointer 128 to a linked list 142 of file records at the next lower level. The linked list 142 comprises file records LETTER1.DOC 110, LETTER2.DOC 111, and LETTER3.DOC 112 linked by pointers 129 and 130. The template 10 shows the record layout used throughout the drawings. In a preferred embodiment, the records shown in FIG. 1B are DirEntry and FileEntry structures as described below.

Figure 1C:
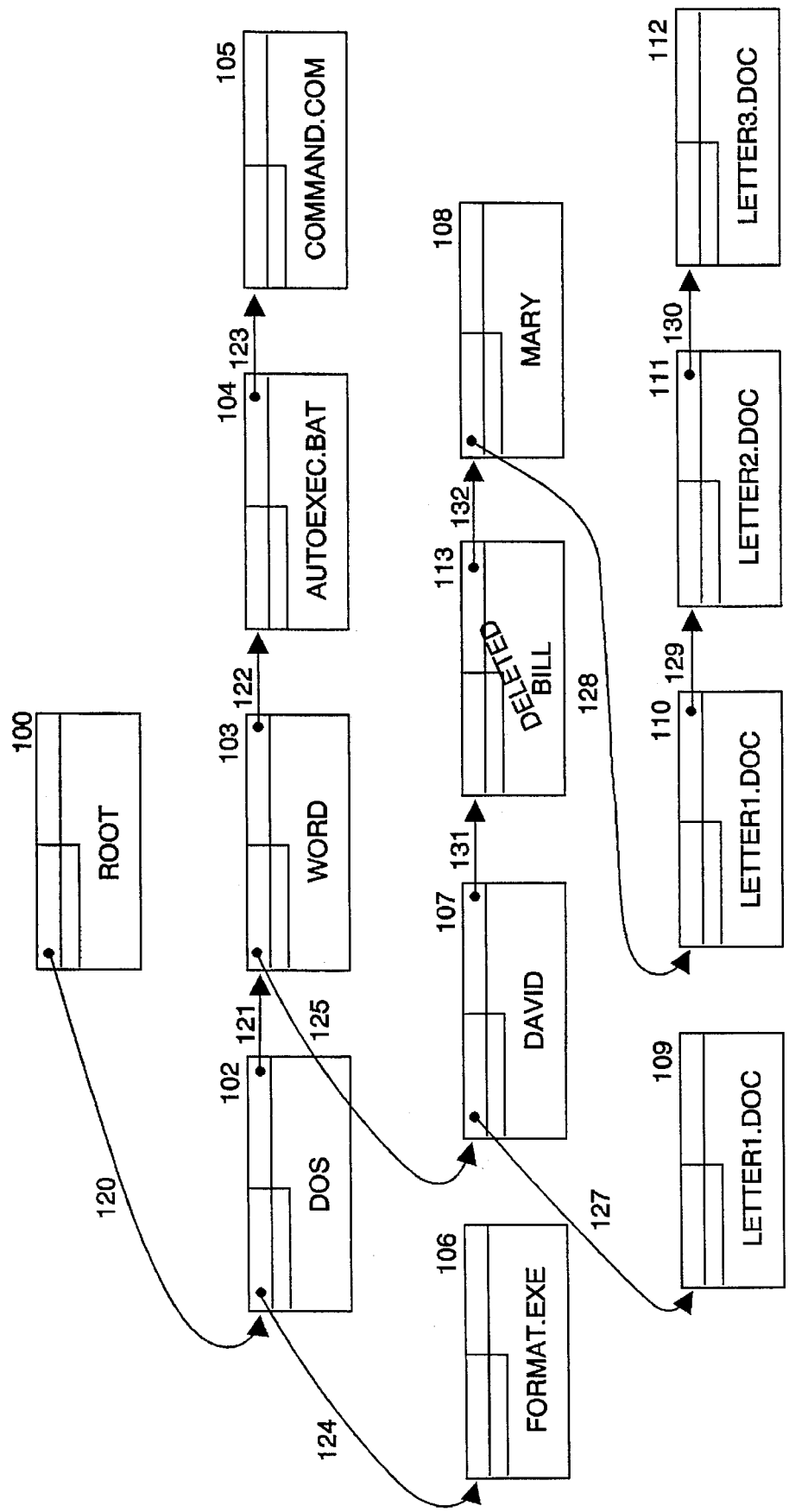
FIG. 1C shows an alternate linked-list structure that represents the same directory structure of FIG. 1A.

FIG. 1B represents just one possible linked list arrangement that represents FIG. 1A. The arrangement would be different if files had been added but then deleted or if the name of a directory was changed. FIG. 1C shows another possible arrangement. FIG. 1C represents the same directory hierarchy as FIG. 1A, but the directory BILL 113 existed at one time but has been deleted. Because an FEProm device can be written only once (unless erased), in a preferred embodiment of the present invention, directory record BILL 113, as shown in FIG. 1C, is not physically removed from the linked list. A directory or file record is deleted from the linked list by setting the status of the directory or file entry. If the directory or file was stored on a computer disk, then directory record BILL 113 could be physically removed by rewriting the pointer 131 in directory record DAVID 107 to point to directory record MARY 108.

Figure 2A:
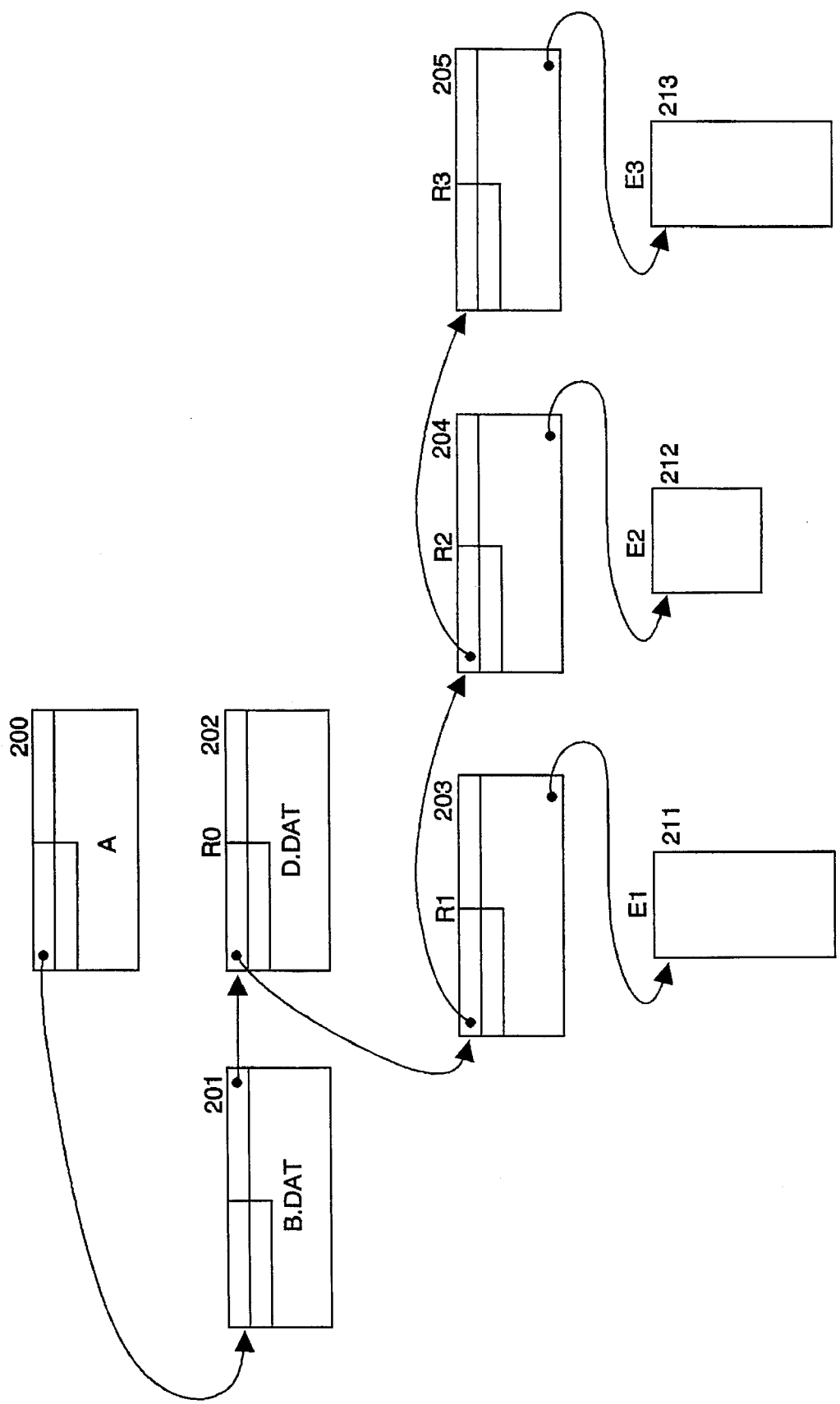
FIG. 2A shows a linked-list structure for the file named "\A\D.DAT".

A preferred embodiment also uses a linked-list data structure to link the extents that compose a file. Each file has a file record associated with it that contains, among other data, the name of the file and that is linked into the directory hierarchy as described above. An extent is a contiguous area of memory that contains data for the file. Each file comprises one or more extents, which contain the file data. Each extent has an extent record associated with it. The extent record contains, among other data, a pointer to the extent and the length of the extent. FIG. 2A shows the extents of the file "\A\D.DAT" 202. The extent records R1 203, R2 204, and R3 205 are linked and contain a pointer to the corresponding extents E1 211, E2 212, and E3 213. The file is the logical concatenation of extents E1 211, E2 212, and E3 213. In a preferred embodiment, the extent records are FileInfo structures as described below.

Figure 2B:
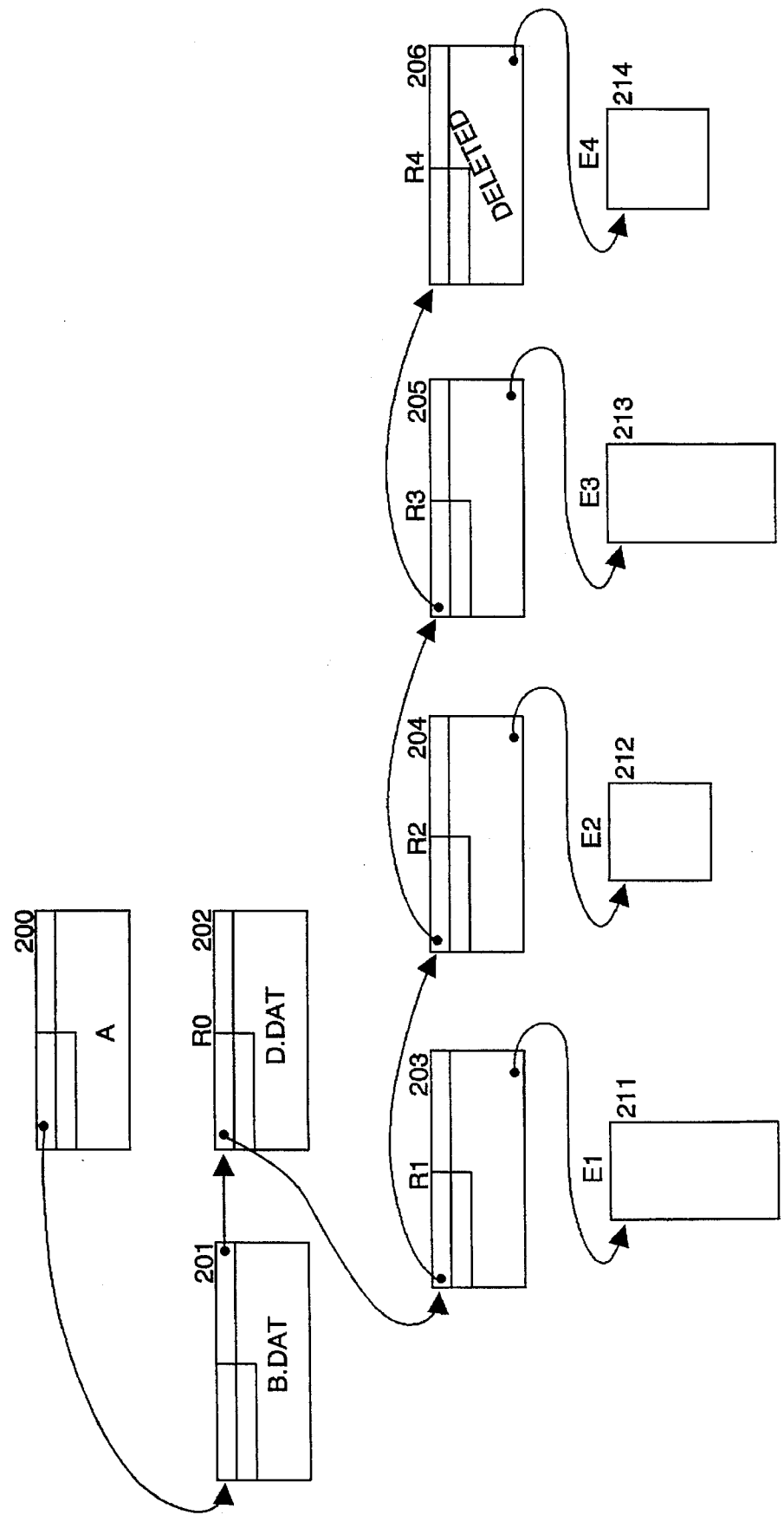
FIG. 2B shows an alternate linked-list structure for the file named "\A\D.DAT".

FIG. 2A represents just one possible linked list arrangement for file "\A\D.DAT" 202. FIG. 2B shows another arrangement that represents the same file. The extent E4 214 was added to the file but then deleted. In a preferred embodiment, the extent record R4 206 is not physically removed from the linked list of extents that compose the file. Rather, the extent record R4 206 is logically removed by setting status of the record to indicate the record is deleted.

Tables C and D contain several data structures used in a preferred embodiment of the present invention. The data structure shown in Table C is the BootRecord. The BootRecord contains some general information relating to the identification of the file system, the version number of file system that can access the FEProm, pointer to the root directory, and additional data as explained below. The first and second structures shown in Table D are the DirEntry and FileEntry structures. One of these structures is allocated for each directory and file. The structures are identical. The variable SiblingPtr points to the next sibling in the linked list of DirEntry and FileEntry structures at the same level in the directory hierarchy. The variables PrimaryPtr and SecondaryPtr are fully described below. The third structure is the FileInfo structure. Each file extent has an associated FileInfo structure. The variable PrimaryPtr points to the FileInfo structure for the file.

TABLE C

Data Structure struct BootRecord
{

| | | |
|---|---|---|
| | word | Signature; |
| | dword | SerialNumber; |
| | word | FFSWriteVersion; |
| | word | FFSReadVersion; |
| | word | TotalBlockCount; |
| | word | SpareBlockCount; |
| | dword | BlockLen; |
| | dword | RootDirectoryPtr; |
| | word | Status; |
| | byte | VolumeLabelLen; |
| | word | BootCodeLen; |
| | byte | VolumeLabel[ ]; |
| | byte | BootCode[ ]; |

}
Definition

| | |
|---|---|
| Signature | a value which indicates that the media supports this file system |
| SerialNumber | combined with VolumeLabel is a unique identifier for the particular FEProm |
| FFSWriteVersion | version number in high byte and revision number in low byte of file system that is required to write to this volume |
| FFSReadVersion | version number in high byte and revision number in low byte of the earliest version of file system that is required to read this volume |
| TotalBlockCount | total number of blocks, including spare blocks, in the FEProm |
| SpareBlockCount | number of blocks availabe for block reclamation and error recovery |
| BlockLen | length of a block in bytes |
| RootDirectoryPtr | pointer to the root directory |
| Status | data specifying file name formats |
| VolumeLabelLen | number of characters in the volume label |
| BootCodeLen | number of bytes in boot code array; if 0 then media is not bootable |
| VolumeLabel[ ] | volume label |
| BootCode[ ] | boot code for the operating system |

TABLE D

Data structure struct DirEntry
{

| | | |
|---|---|---|
| | word | Status; |
| | dword | SiblingPtr; |
| | dword | PrimaryPtr; |
| | dword | SecondaryPtr; |
| | byte | Attributes; |
| | word | Time; |
| | word | Date; |
| | byte | NameLen; |
| | byte | Name[8]; |
| | byte | Ext[3]; |

TABLE D-continued

```
}
struct FileEntry
{
        word    Status;
        dword   SiblingPtr;
        dword   PrimaryPtr;
        dword   SecondaryPtr;
        byte    Attributes;
        word    Time;
        word    Date;
        byte    NameLen;
        byte    Name[8];
        byte    Ext[3];
}
struct FileInfo
{
        word    Status;
        dword   ExtentPtr;
        dword   PrimaryPtr;
        dword   SecondaryPtr;
        byte    Attributes;
        word    Time;
        word    Date;
        word    ExtentLen;
        word    UncompressedExtentLen;
}
Definitions
```

| | |
|---|---|
| Name | directory/file name |
| Ext | file extension |
| Status bit # | |
| 0 | 1:record exists in the directory structure (Exists) 0:record has been deleted from the directory structure (Deleted) |
| 1 | 1:record contains current attributes, date, and time data (ATDRecent) 0:record contains data that has been superseded or no data (ATDSuperseded) |
| 3-2 | 11:Undefined 10:FileInfo 01:FileEntry 00:DirEntry |
| 4 | 1:PrimaryPtr is not valid 0:PrimaryPtr is valid (PrimaryPtrValid) |
| 5 | 1:SecondaryPtr is not valid 0:SecondaryPtr is valid (secondaryPtrValid) |
| 6 | 1:Sibling Ptr/ExtentPtr is not valid 0:SiblingPtr/ExtentPtr is valid (SiblingPtrValid/ExtentPtrValid) |
| DirEntry | |
| 15-7 | reserved |
| FileEntry | |
| 7 | 1:file is not compressed 0:file is compressed |
| 15-8 | identification of compression algorithm |
| FileInfo | |
| 7 | 1:file is not compressed 0:file is compressed |
| 8 | 1:extent does not contain first segment of a compressed block 0:extent contains first segment of a compressed block |
| 9 | 1:extent does not contain last segment of a compressed block 0:extent does contain last segment of a compressed block |
| 15-10 | reserved |
| SiblingPtr | Pointer to next DirEntry or FileEntry in sibling chain |
| ExtentPtr | pointer to the extent associated with the FileInfoEntry |
| PrimaryPtr | DirEntry: points to the first DirEntry or FileEntry on the next lower level in the directory hierarchy FileEntry: points to the linked list of FileInfo entries associated with the file FileInfo: points to the next FileInfo entry for the file |
| SecondaryPtr | DirEntry: points to the next DirEntry entry for the directory; all contents of this entry except the SecondaryPtr are invalid and are to be ignored FileEntry: points to the next FileEntry entry for the file; all contents of this entry except the SecondaryPtr are invalid and are to be ignored FileInfo: points to the next FileInfo entry for the file |
| Attributes | file attributes such as read-only, read/write, etc. |
| Time | time of creation or modification |
| Date | date of creation or modification |
| NameLen | length in bytes of name and extension |
| Name[8] | name |
| Ext [3] | Extension |
| ExtentLen | length of extent in bytes |

Figure 26:
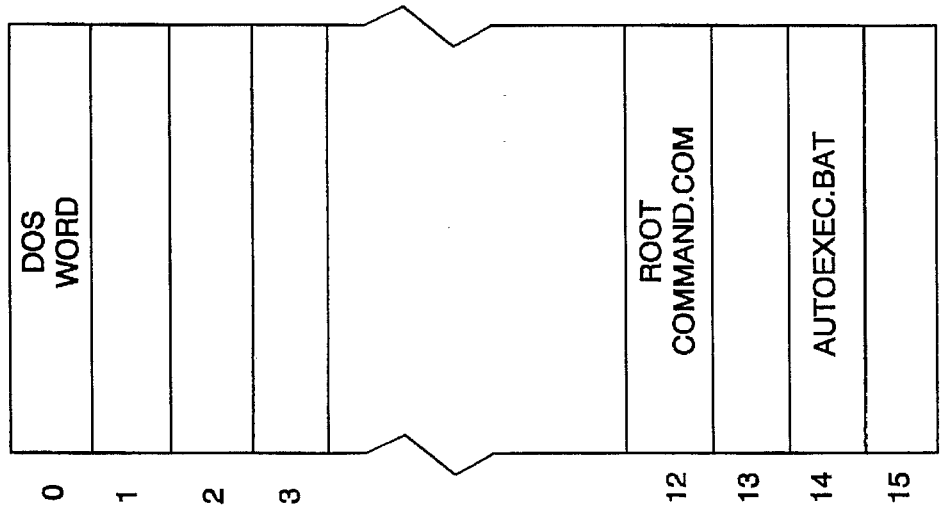
FIG. 26 shows a sample block allocation for a portion of the directory hierarchy of FIG. 1B.
Figure 3:
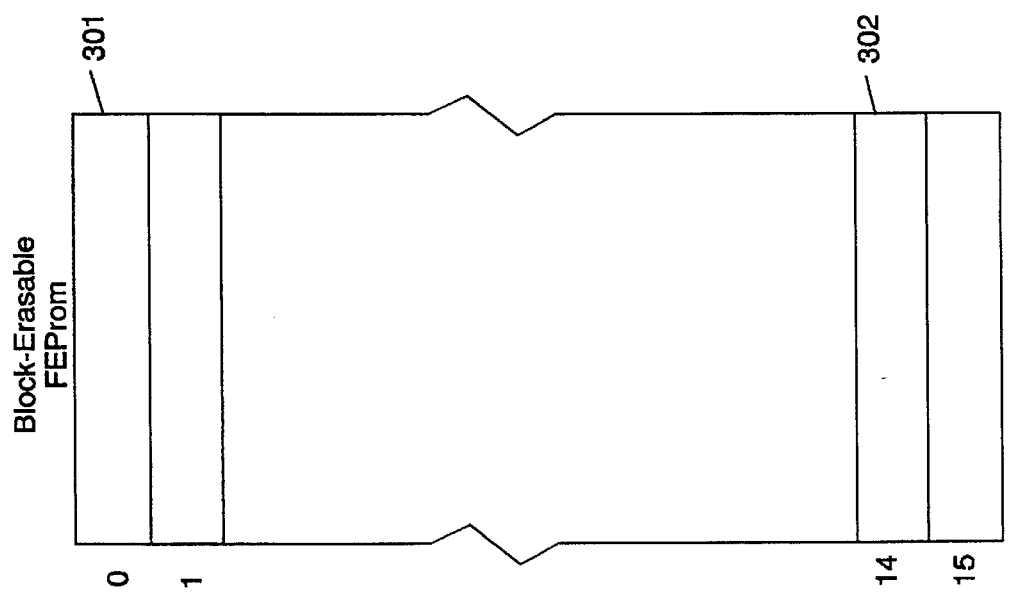
FIG. 3 shows the layout of a block-erasable FEProm in a preferred embodiment of the present invention.

The file system of the present invention distributes the directory and file structures across block boundaries in a block-erasable FEProm. The file system uses the FEProm manager to allocate and deallocate storage in the FEProm. The file system uses handles as described above as pointers in the linked lists. In the following, term handles and pointers are used interchangeably. FIG. 26 shows a sample block allocation for a portion of the directory hierarchy of FIG. 1B. The portion shown in FIG. 26 comprises the DirEntry and FileEntry records for the directory ROOT, directory DOS, directory WORD, file AUTOEXEC.BAT, and file COMMAND.COM. Block 0 contains directory DOS, and directory WORD; block 12 contains directory ROOT and file COMMAND.COM; and block 14 contains file AUTOEXEC.BAT.

Figure 24:
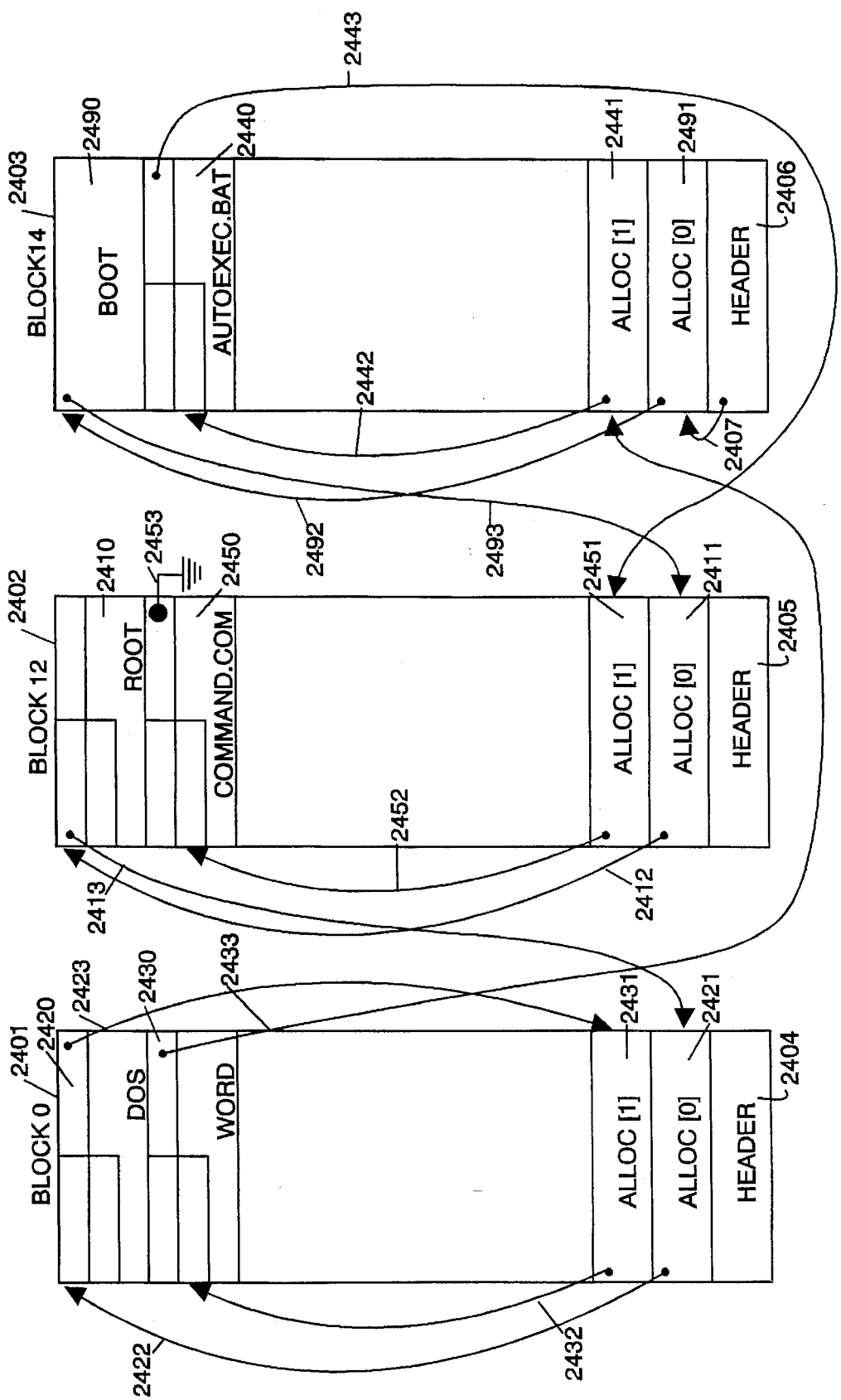
FIG. 24 shows sample block allocation structures and regions for the sample of FIG. 26.

FIG. 24 shows sample block allocation structures and regions for the sample of FIG. 26. FIG. 24 shows block 0 2401, block 12 2402, and block 14 2403. Block 0 2401 contains regions 2420 and 2430. Region 2420 contains the DirEntry for directory DOS, and region 2430 contains the DirEntry for directory WORD. Block 0 2401 also contains header 2404. Alloc[0] entry 2421 corresponding to region 2420, and Alloc[1] entry 2431 corresponding to region 2430. Block 12 2402 contains regions 2410 and 2450. Region 2410 contains the DirEntry for directory ROOT, and region 2450 contains the FileEntry for file COMMAND.COM. Block 12 2402 also contains the block header 2405, Alloc[0] entry 2411 corresponding to region 2410, and Alloc[1] entry 2451 corresponding to region 2450. Block 14 2403 contains regions 2490 and 2440. Region 2490 contains the boot record, and region 2440 contains the FileEntry for file AUTOEXEC.BAT. Block 14 2403 also contains the block header 2406, Alloc[0] entry 2491 corresponding to region 2490, and Alloc[1] entry 2441 corresponding to region 2440.

In FIG. 24, the pointers 2407, 2413, 2423, 2433, 2443, 2453, and 2493 define the directory hierarchy starting from pointer 2407 to the boot record in block header 2406. The boot record 2490 is in block 14 2403. The variable Status for block 14 2403 indicates that the block contains the boot directory. The BootRecordPtr 2407 points to the Alloc[0] entry 2491 for the boot record. Alloc[0] entry 2491 contains the variable Offset 2492, which contains the offset of region 2490. Region 2490 contains the boot record. The boot record contains pointer RootDirectoryPtr 2493, which points to the Alloc[0] entry 2411 corresponding to directory ROOT. The Alloc[0] entry 2411 contains variable Offset 2412, which contains the offset of region 2410. Region 2410 contains the DirEntry for directory ROOT. The PrimaryPtr 2413 of directory ROOT points to Alloc[0] entry 2421 corresponding to directory DOS. Alloc[0] entry 2421 contains the variable Offset 2422, which contains the offset of region 2420. Region 2420 contains the DirEntry for directory DOS. The pointer SiblingPtr 2423 of directory DOS points to Alloc[1] entry 2431 for directory WORD. The Alloc[1] entry 2431 contains the variable Offset 2432, which contains the offset of region 2430. Region 2430 contains the DirEntry for directory WORD. The pointer SiblingPtr 2433 of directory WORD points to Alloc[1] entry 2441 for file AUTOEXEC.BAT. The Alloc[1] entry 2441 contains variable Offset 2442, which contains the offset of region 2440. Region 2440 contains the FileEntry for file AUTOEXEC.BAT. The pointer SiblingPtr 2443 for file AUTOEXEC.BAT points to the Alloc[1] entry 2451 for file COMMAND.COM. The Alloc[1] entry 2451 contains variable Offset 2452, which contains the offset of region 2450. Region 2450 contains the FileEntry for file COMMAND.COM. The SiblingPtr 2453 is set to FNULL indicating the end of the linked list.

Figure 4:
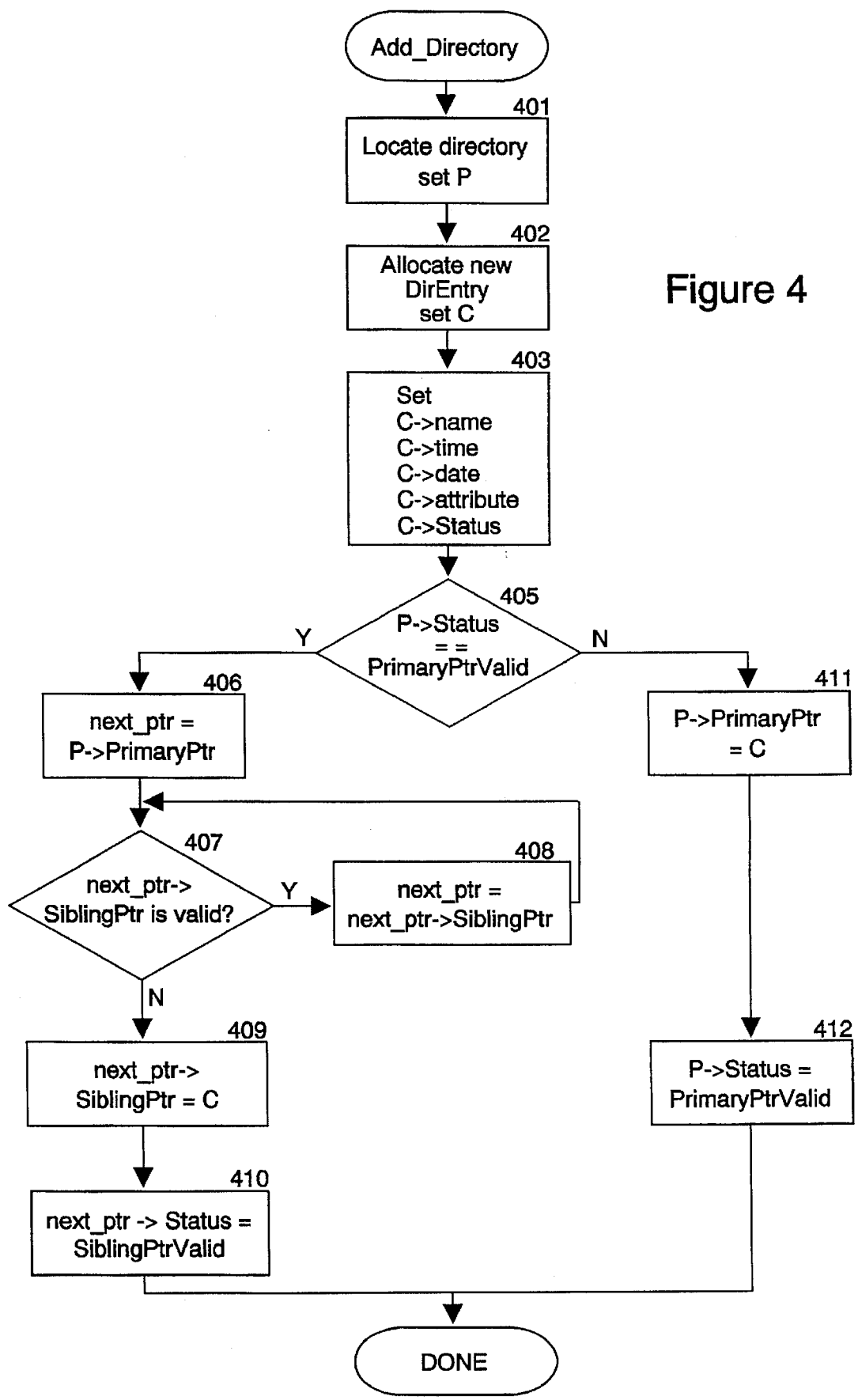
FIG. 4 shows a flow diagram of the Add_Directory routine in a in a preferred embodiment of the present invention.
Figure 5:
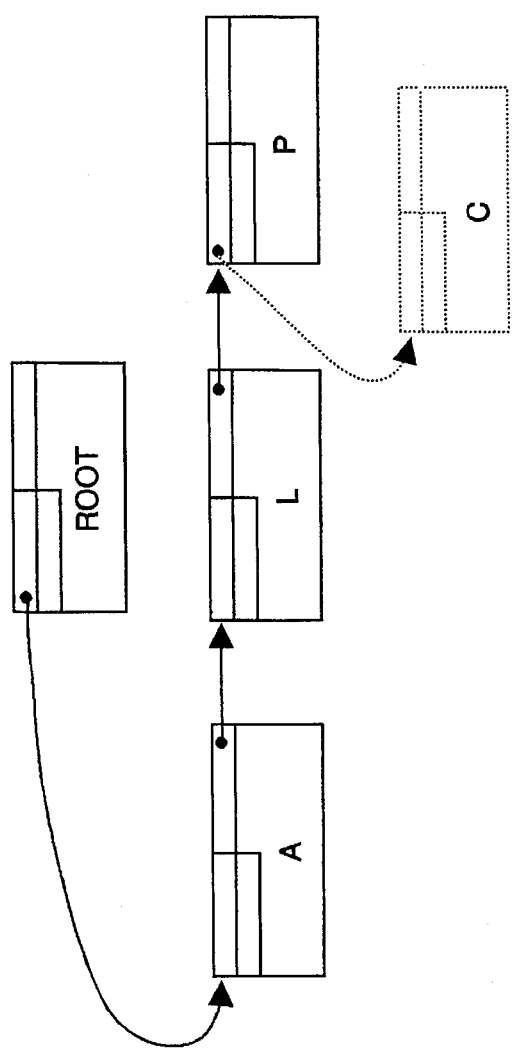
FIGS. 5 and 6 show before and after pictorials of the directory structure with a newly added directory in a preferred embodiment of the present invention.
Figure 6:
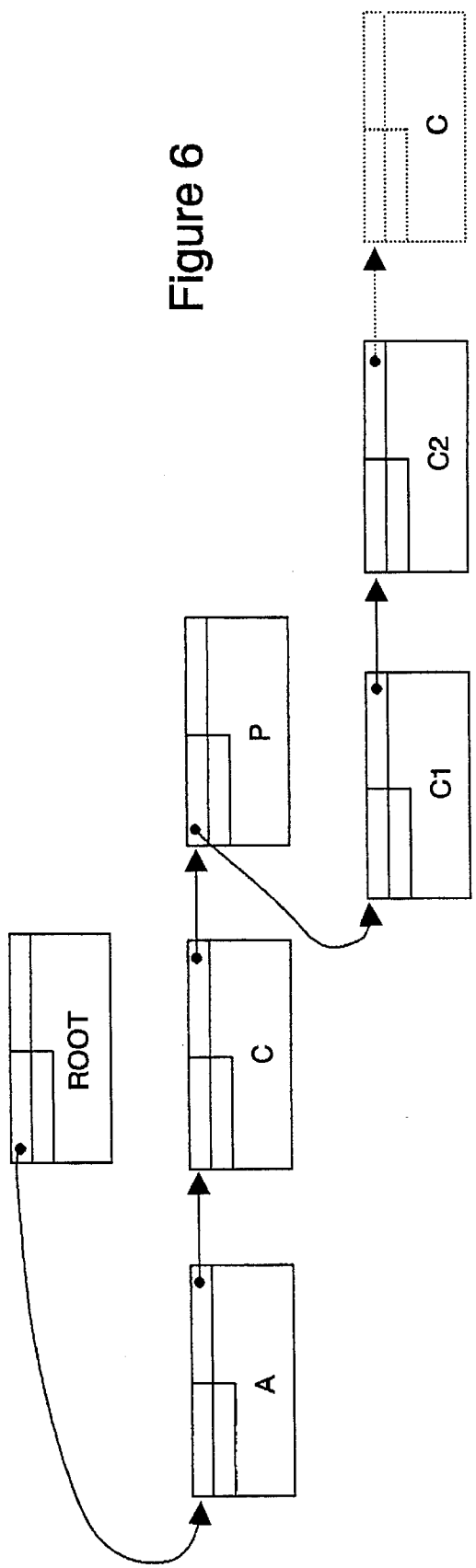

The file system allows for directories to be added and deleted, and files to be created, extended, and modified. FIG. 4 shows a flow diagram for the routine that adds a directory to the FEProm. The input parameters to this routine are the complete pathname of the new directory and attribute data for the new directory. This routine will set the variable P to contain the address of the DirEntry for the parent directory and the variable C to contain the address of the DirEntry for the child directory. For example, the path name "\P\C" means that a directory C is to be created that is a subdirectory of P, which is a subdirectory of the root directory. FIG. 5 shows when directory C would be the first subdirectory of P, and FIG. 6 shows when directory C would not be the first subdirectory of P. Referring to FIGS. 5 and 6, the solid lines show the directory structure before directory C is added and the broken lines show the directory structure after directory C is added.

In block 401 of FIG. 4, the system locates directory P by following the path from the root directory and setting variable P to point to DirEntry for directory P. When locating directory P, the system follows the variable PrimaryPtr unless superseded by the variable SecondaryPtr. In block 402, the system allocates a region for the DirEntry for directory C. The system allocates the region by invoking the procedures of the FEProm manager. The system sets the variable C to point to the allocated region. In the following, the handle that is returned from the FEProm manager is referred to as the pointer to the regions. In block 403, the system sets the variables Name, Time, Date, and Attributes in the newly allocated record and sets the variable Status to indicate that the newly allocated entry is a directory entry.

In blocks 405 through 412, the system links the new directory entry into the old directory structure. In blocks 406 through 410, the system handles the situation where the new directory is not the first subdirectory of P. In blocks 411 and 412, the system handles the situation where the new directory is the first subdirectory of P. In block 405, if p->Status indicates the PrimaryPtr is valid, then directory P has or has had a so. directory, and the system continues at block 406, else directory P has had no subdirectory and the system continues at block 411. In block 411, the system sets P->PrimaryPtr to point to directory C, the newly allocated directory entry to effect the linking to the new directory. In block 412, the system sets P->Status to indicate that the variable PrimaryPtr is valid and then the routine is done.

In block 406, the system sets the variable next_ptr equal to P->PrimaryPtr. The variable next_ptr contains the pointer to the next directory in the linked list of sibling subdirectories. In block 407, if Status of the record pointed to by next_ptr indicates SiblingPtr is valid, then the system continues at block 408, else the end of the linked list of siblings has been reached and the system continues at block 409. In block 408, the system sets next_ptr equal to the SiblingPtr of the record pointed to by next_ptr, which advances next_ptr to point to the next directory in the linked list, and continues at block 407 to determine if the end of the linked list has been reached. When searching for the end of the linked list of siblings, the system follows the variable SiblingPtr. In block 409, the system sets SiblingPtr of the record pointed to by next_ptr equal to the pointer to DirEntry for directory C. In block 410, the system sets Status of the record pointed to by next_ptr to indicate that the SiblingPtr in the entry that points to the newly allocated directory entry is valid and then the routine is done.

Figure 8:
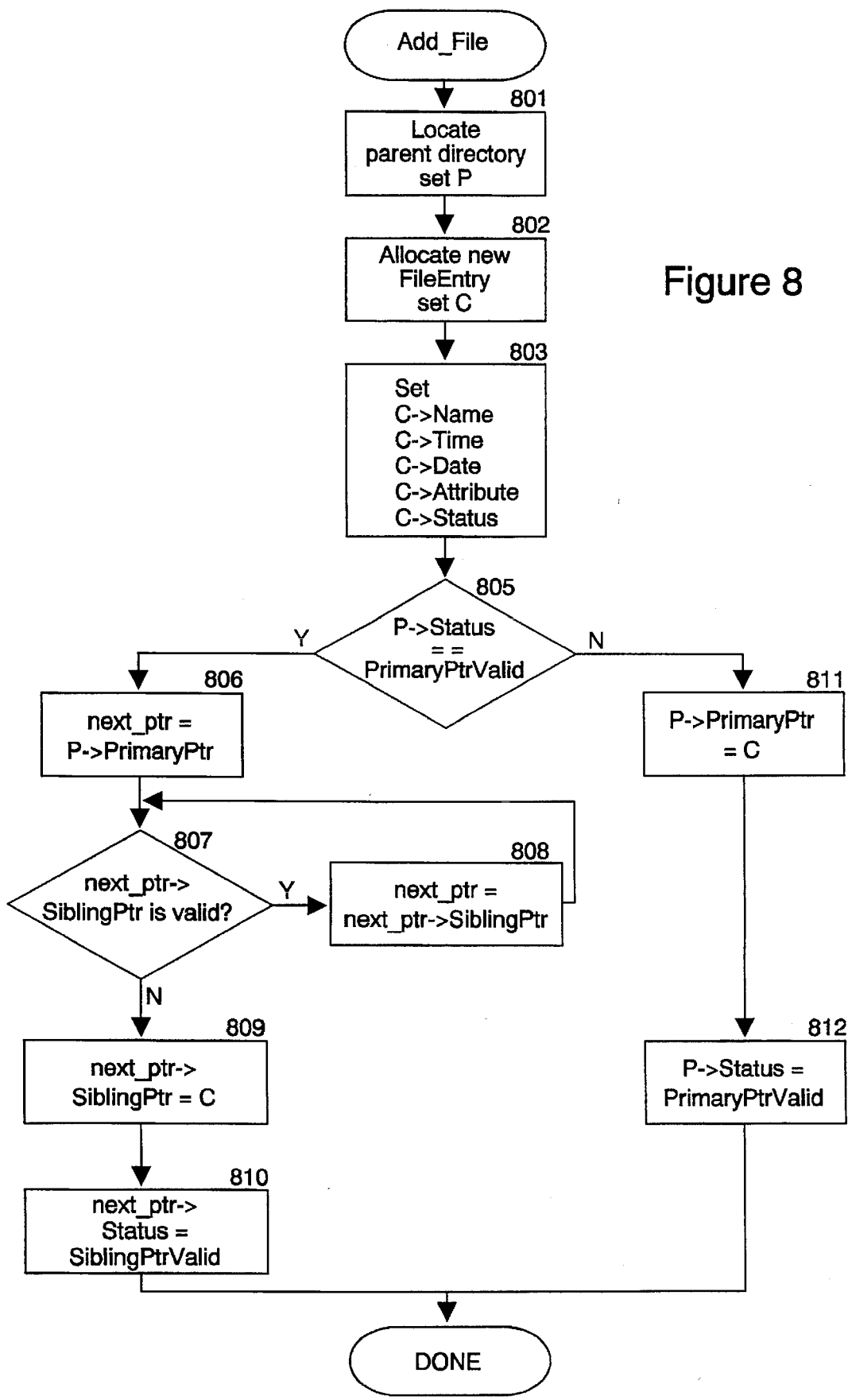
FIG. 8 shows a flow diagram of the Add_File routine in a preferred embodiment of the present invention.

FIG. 8 shows a flow diagram of the routine that adds a FileEntry record into the file system for a new file. Since FileEntry records are simply leaf nodes of the hierarchical tree-structured file system, the routine that adds the FileEntry records is very similar to the routine for DirEntry records, which is Add_Directory, shown in FIG. 4. The significant difference is that the variable Status is set to indicate the record is a file in block 803.

FIG. 10 shows a flow diagram of the routine to add data onto the end of a file. This routine is passed the complete pathname, the data to write, and the number of bytes to write. FIG. 11 shows a sample layout of the directory structure that contains the file \L.DAT that is to be extended. The solid lines show the structure before the file is extended and the broken lines show the structure after the file is extended. Initially, the file L.DAT has FileEntry record 1101, FileInfo record 1102, and extent 1103 associated with it. The broken lines represent a FileInfo record 1104 with the data to be added to the file in extent D2 1105.

Figure 10A:
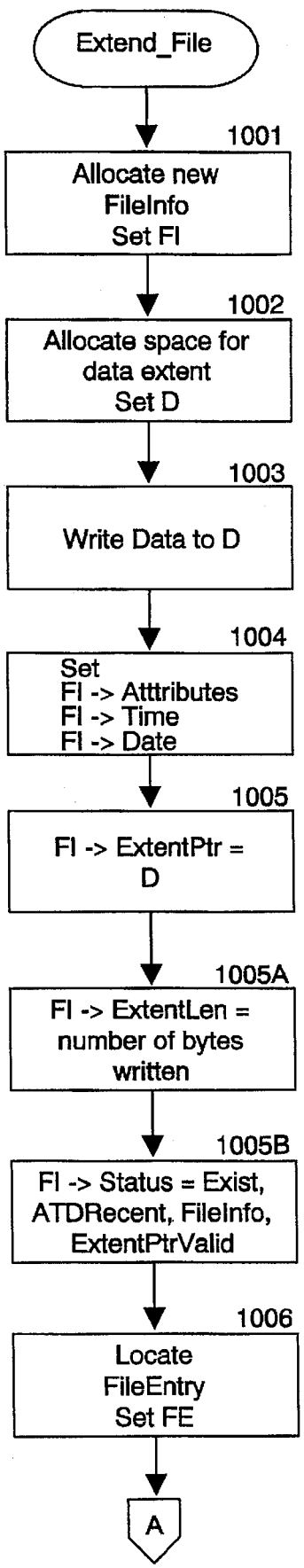
FIGS. 10A–10B shows a flow diagram of the Extend_File routine in a preferred embodiment of the present invention.
Figure 10B:
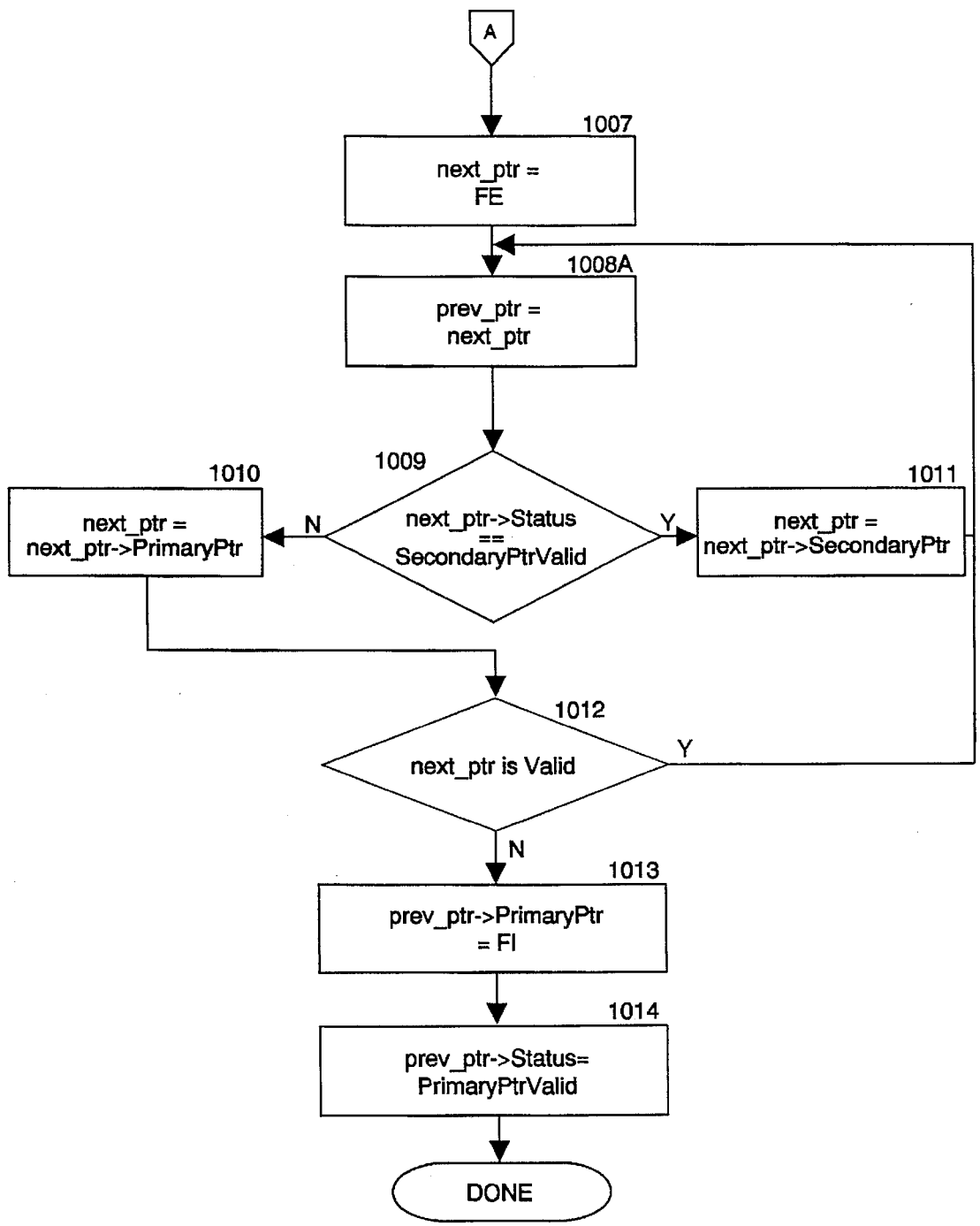
Figure 11:
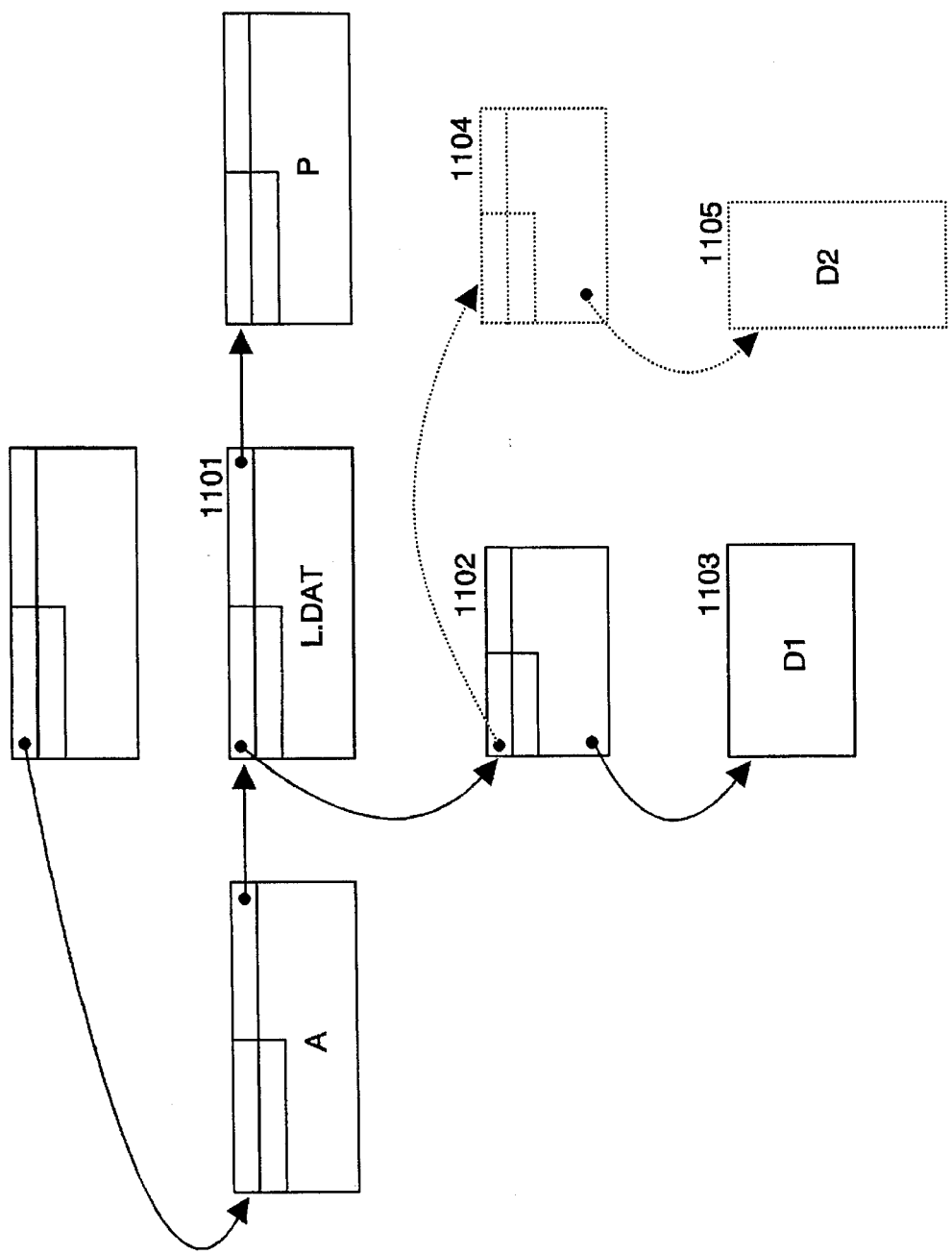
FIG. 11 shows a sample directory and file layout using a preferred embodiment of the present invention.

Referring to FIG. 10A–10B in block 1001, the system allocates a region for new FileInfo record in the FEProm and sets the variable FI to point to that record. In block 1002, the system allocates a region for the data extent and sets the variable D to point to the extent. In block 1003, the system writes the data to the allocated block. In block 1004, the system sets the variables Attributes, Time, and Date in the allocated FileInfo entry. In block 1005, the system sets FI->ExtentPtr to the handle of the allocated extent. In block 1005A, the system sets FI->ExtentLen to contain the length of the extent. In block 1005B, the system sets FI->Status to Exists, ATDRecent, FileInfo, and ExtentPtrValid. In block 1006, the system locates the FileEntry record for the file to be extended and sets FE to the address of that record. In a preferred embodiment, the system would locate the FileEntry record before allocating the new extent and FileInfo record to ensure that the file exists before any allocation is done.

In blocks 1007 through 1012, the system locates the last FileInfo record (if one exists) for the file to be extended. The system follows the PrimaryPtr or the SecondaryPtr of the FileEntry record and the FileInfo records. A valid SecondaryPtr indicates that the record pointed to by the PrimaryPtr has been superseded by the data in the record pointed to by the SecondaryPtr. In block 1007, the system sets pointer next_ptr equal to the pointer to the FileEntry record. In block 1008A, the system sets the pointer prev_ptr equal to next_ptr. When the last FileInfo record in the file is located, the pointer prev_ptr will contain the pointer to that record. In block 1009, if Status of the record pointed to by next_ptr indicates that the SecondaryPtr is valid, then the data in the record pointed to by the PrimaryPtr has been superseded and the system continues at block 1011, else the system continues at block 1010. In block 1010, the system sets next_ptr equal to PrimaryPtr of the record pointed to by next_ptr to get the pointer to the next record in the linked list and continues at block 1012. In block 1011, the system sets next_ptr equal to SecondaryPtr of the record pointed to by next_ptr to get the pointer to the next record in the linked list and continues at block 1008A. In block 1012, if next_ptr is valid, then the end of the linked list has been reached and the system continues at block 1013, else the system continues at 1008A to process the next record in the linked list. In block 1013, the system sets PrimaryPtr of the record pointed to by prev_ptr equal to the pointer to FI to effect the extending of the file. In block 1014, the system sets Status of the record pointed to by prev_ptr equal to PrimaryPtrValid and the routine is done.

Figure 12A:
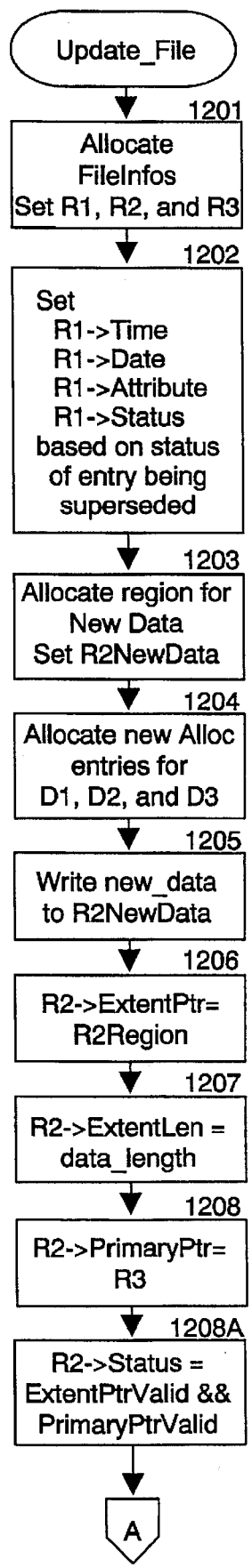
FIGS. 12A–12B shows a flow diagram of the Update_File routine in a preferred embodiment of the present invention.
Figure 12B:
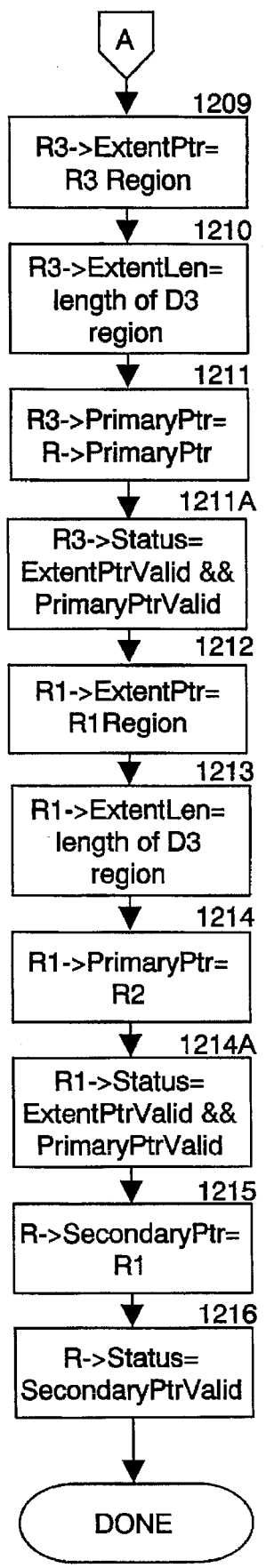

FIGS. 12A–12B shows a flow diagram for the routine, Update_File, that updates the data in a file. The parameters for this routine are R, the address of the FileInfo block that is to have its associated extent modified; extent_offset, the offset into the extent for the new data; new_data, the new data; and data_length, the length of the new data. Since the FEProm is effectively a write once device, at least until a block is erased, a region where data is stored cannot be rewritten when an update to a file occurs. In a preferred embodiment, the updated data is written to a different region of the FEProm, as described below.

Figure 13:
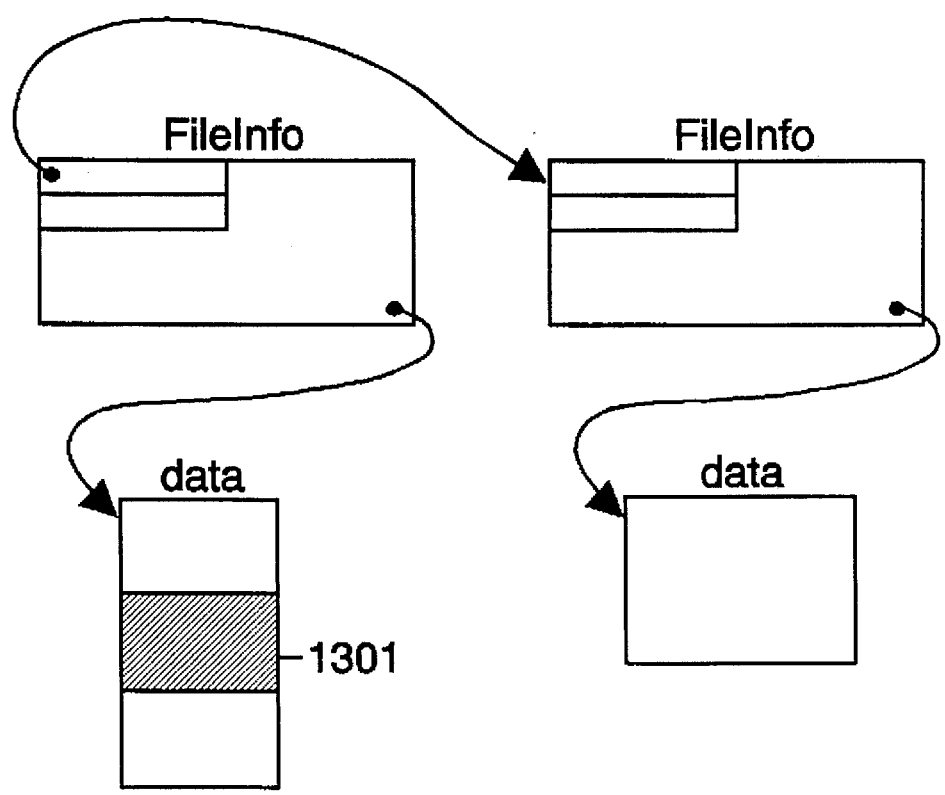
FIGS. 13 and 14 show a sample portion of a file before and after it is updated in a preferred embodiment of the present invention.
Figure 14:
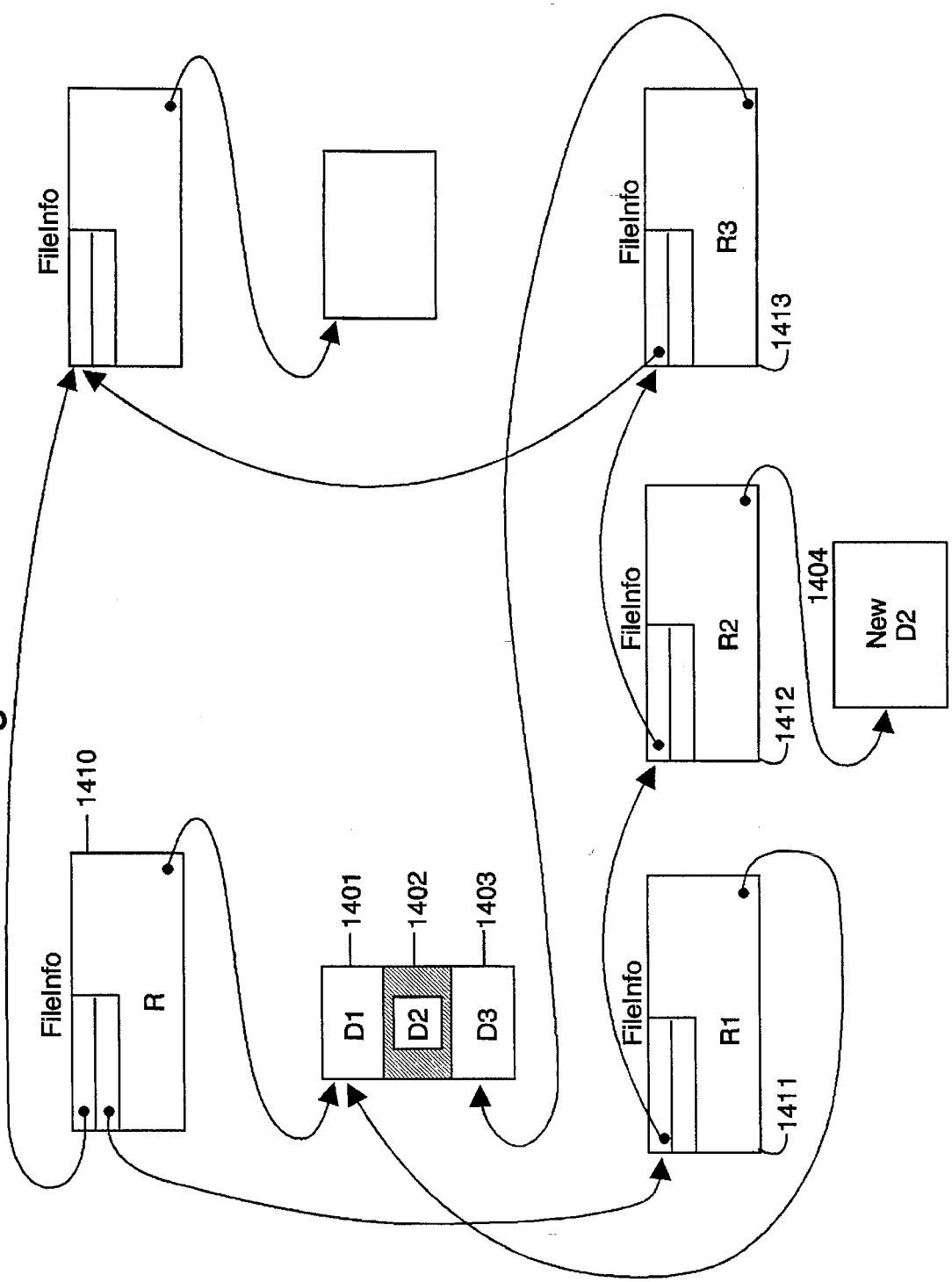

FIG. 13 shows a typical portion of the linked list of the FileInfo records for a file. The Update_File routine will replace the data represented by the shaded area 1301. FIG. 14 shows the structure of the linked list after the modified data has been written to the FEProm. Three FileInfo records R1 1411, R2 1412, and R3 1413, have been inserted into the linked list. The entire extent is not rewritten, rather only the portion that actually changed is rewritten. The routine divides the extent into three sections, D1 1401, D2 1402, and D3 1403. Sections D1 1401 and D3 1403 contain data that is not changed by the update, and section D2 1402 contains the data that will change. Each section will have a corresponding FileInfo record. The FileInfo records R1 1411, R2 1412, and R3 1413 are linked through their PrimaryPtr fields. Also, the ExtentPtr field in R1 1411 and R3 1413, are set to point to their corresponding extent sections, and the ExtentLen fields are set. A new extent is allocated for the new data corresponding to the section new D2 1404, which is pointed to by record R2 1412. The SecondaryPtr of record R 1410 points to FileInfo R1 1411 to indicate that the PrimaryPtr of R 1410 is superseded. The PrimaryPtr of FileInfo record R3 1413 is set to the value contained in the PrimaryPtr of FileInfo record R 1410 to complete the link.

The Update_File routine depends upon there being sufficient space in the block that contains the extent to add three new Alloc entries. These three Alloc entries will redefine the extent into three regions rather than one region. If there is not sufficient space, then a reclamation of the block may produce enough free space, and the Update_File routine can be invoked. If, however, there is not sufficient free space, the data in the extent is moved to a new extent. If the data is moved, then the new data can be integrated with the old data and written to one region in the new block with only one FileInfo record. The region in the old block is deallocated. In a preferred embodiment, the FEProm manager supports adding Alloc entries to point to portions of an existing region. The example of FIG. 14 would need three new Alloc entries added to the block, which would correspond to newly defined regions associated with D1, D2, and D3. The Alloc entry for D2 would be deallocated and the Alloc entries for D1 and D3 would be allocated. The status of the old Alloc entry that corresponded to the region comprising sections D1, D2, and D3 would be set to indicate that it has been superseded. A status of superseded indicates that the Alloc entry is essentially deallocated with no corresponding region.

In block 1201 of FIG. 12, the system allocates three regions for the FileInfo records and sets the variables R1, R2, and R3 to contain the addresses of the regions. In block 1202, if R->Status indicates ATDRecent, then the system sets R1->Time, R1->Date, and R1->Attributes to the values in R and sets R1->Status to ATDRecent, else the system leaves these fields FNULL. In a preferred embodiment, the FEProm manager supports the setting of the Alloc entries to superseded and allocating Alloc entries for an existing region. In block 1203, the system allocates a region for the new data and sets R2NewData to the address of the region. In block 1204, the system allocates three Alloc entries. The entries are initialized to point to D1, D2, and D3. The status of the Alloc entry that pointed to the region comprising D1, D2, and D3 is set to superseded. In block 1205, the system writes new_data to the new region addressed by R2NewData. In blocks 1206 through 1208A, the system sets the data in FileInfo record R2. In block 1206, the system sets R2->ExtentPtr equal to the pointer to the region for the new data. In block 1207, the system sets R2->ExtentLen equal to the length of the new region. In block 1208, the system sets R2->PrimaryPtr to the pointer to R3. In block 1208A, the system sets R2->Status to indicate the ExtentPtr and PrimaryPtr are valid.

In blocks 1209 through 1211A, the system sets the data in FileInfo record R3. In block 1209, the system sets R3->ExtentPtr equal to the pointer to the D3 region. In block 1210, the system sets R3->ExtentLen equal to the length of the D3 region. In block 1211, the system sets R3->PrimaryPtr equal to R->PrimaryPtr. In block 1211A, the system sets R3->Status to indicate that ExtentPtr and PrimaryPtr are valid.

In blocks 1212 through 1214A, the system sets the data in FileInfo record R1. In block 1212, the system sets R1->ExtentPtr equal to the pointer to region D1. In block 1213, the system sets R1->ExtentLen equal to the length of region D3. In block 1214, the system sets R1->PrimaryPtr to the pointer to R2. In block 1214A, the system sets R1->Status to indicate that ExtentPtr and PrimaryPtr are valid.

In block 1215, the system sets R->SecondaryPtr equal to the pointer to R1. In block 1216, the system sets R->Status to indicate that the SecondaryPtr is valid. Then the routine is done.

Figure 15:
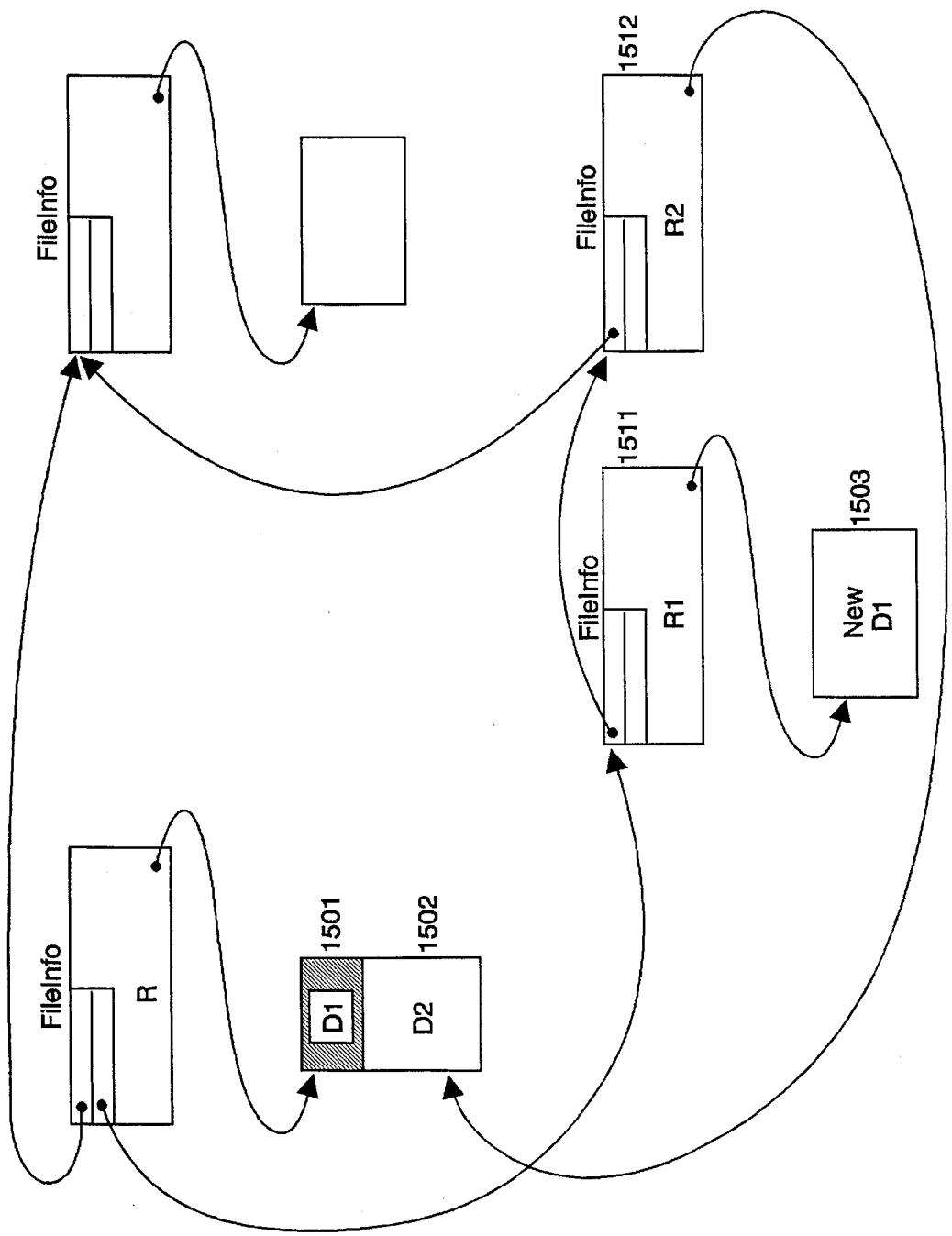
FIGS. 15, 16, and 17 show sample portions of a file after the file is updated in a preferred embodiment of the present invention.
Figure 16:
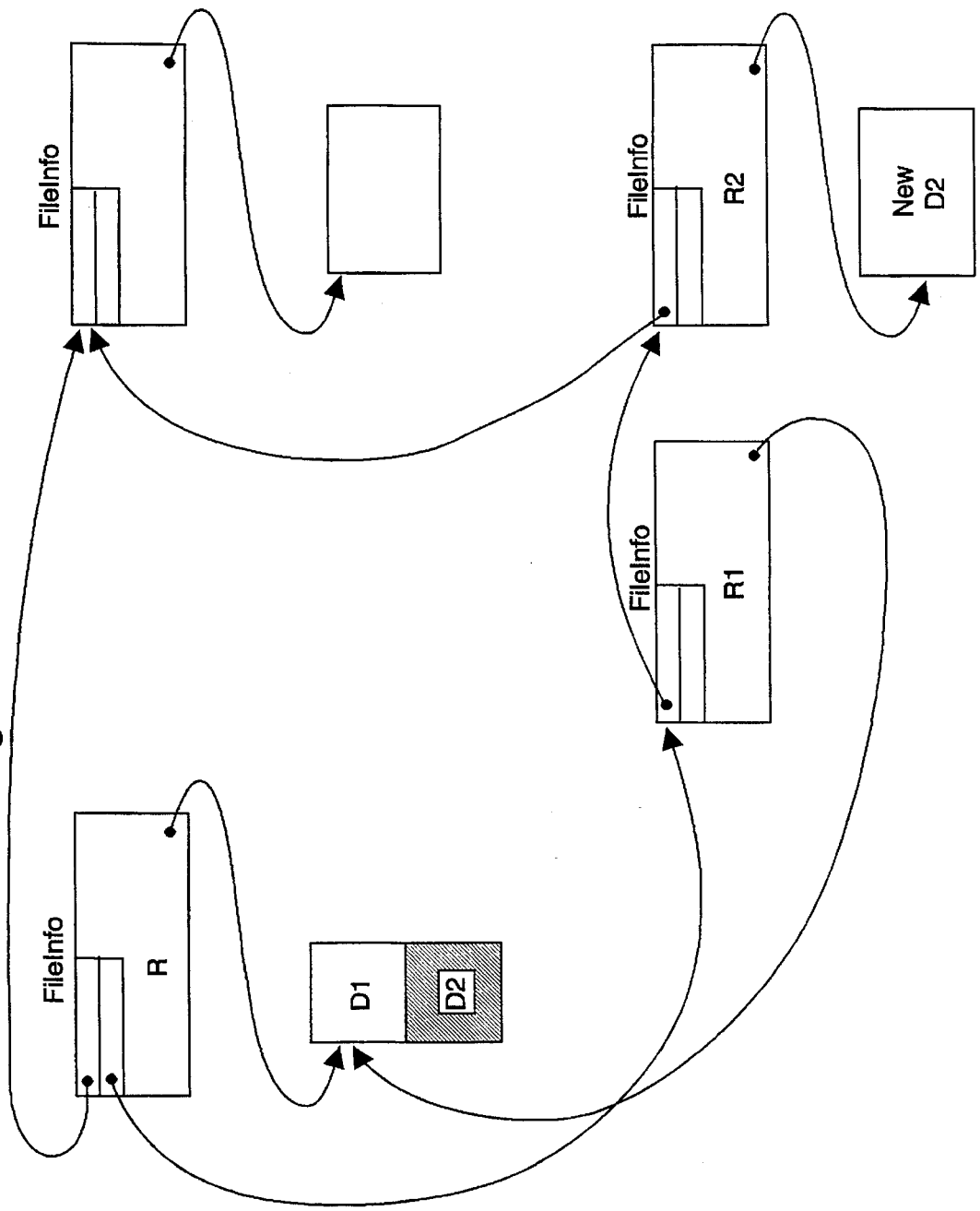

FIGS. 15 and 16 show the FileInfo list for a couple special cases of file updates. The routine for processing for these special cases is a subset of the routine needed for processing the general case, Update_File, shown in FIG. 12. In FIG. 15, data starting at the beginning of an extent is updated. Section D1 1501 contains the data at the beginning of the extent to be updated and section D2 1502 contains the data at the end of the extent that is not updated. Only two new FileInfo records are needed. The first FileInfo record R1 1511 points to the new data 1503 and the second FileInfo record R2 1512 points to the old data in section D2 1502. A similar situation occurs when data that ends on an extent boundary is updated as shown in FIG. 16. As in the general case for a file update, the old region that contains D1 and D2 is subdivided into two regions by allocating two new allocation table entries in the block that contains the old region. Also, if there is not sufficient space for the entries, the unmodified data is moved to a new block.

Figure 17:
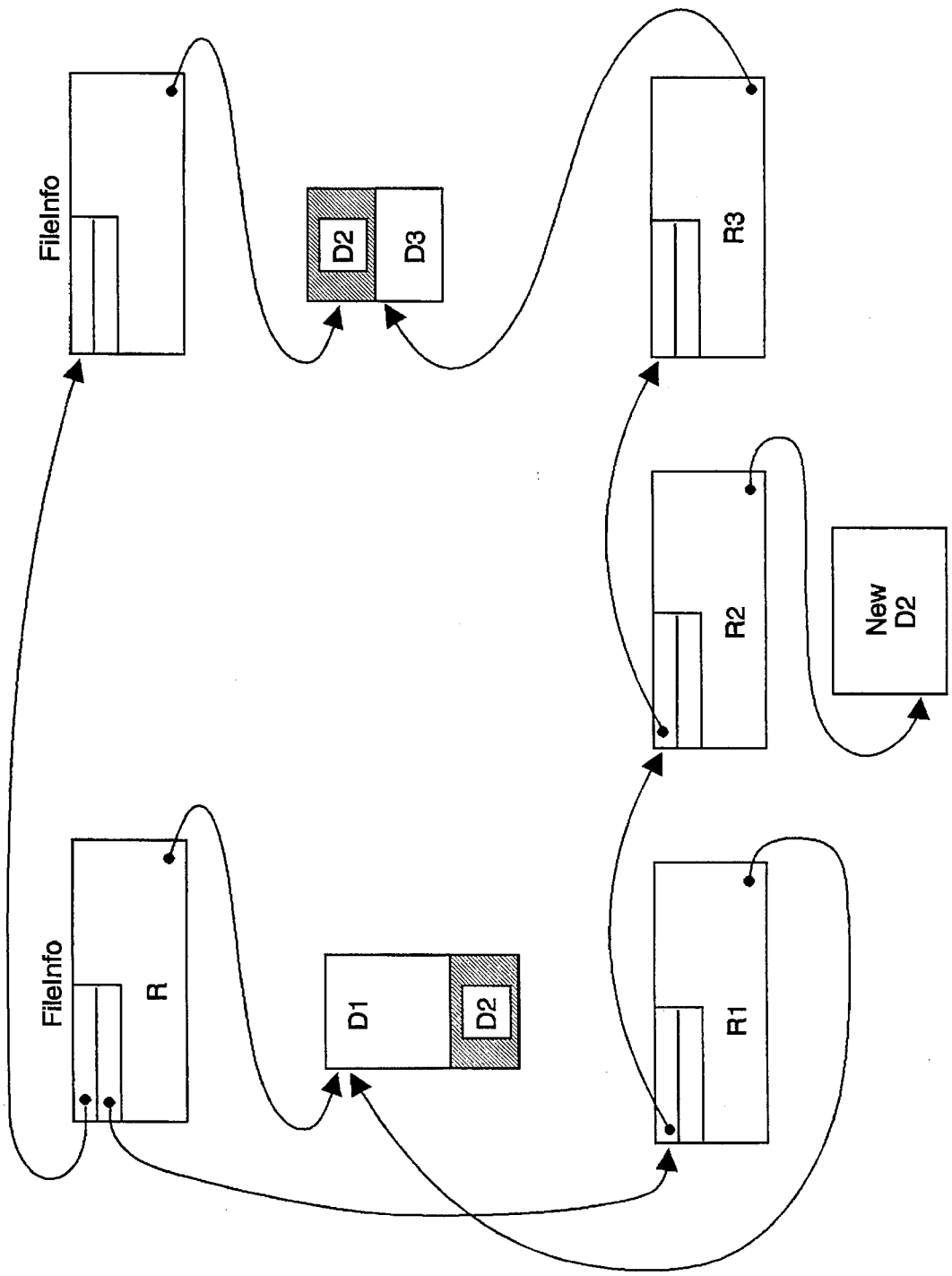

FIG. 17 shows a linked list for FileInfo records when the updated data spans extent boundaries.

Figure 18:
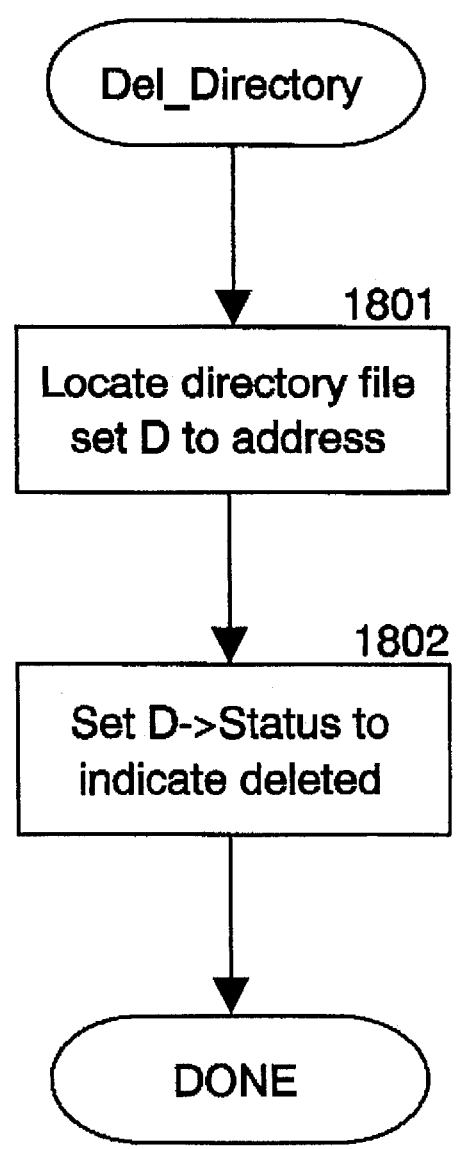
FIG. 18 shows a flow diagram of the Del_Directory routine in a preferred embodiment of the present invention.

FIG. 18 shows a flow diagram of a routine that deletes a directory from the FEProm. The routine to delete a file is similar except that the associated FileInfo records are deallocated. This routine sets the status of the DirEntry to indicate it is deleted. In block 1801, the system locates the directory to be deleted and sets the variable pointer D to contain the address of the directory. In block 1802, the system sets D->Status to indicate that the directory is deleted.

Figure 20:
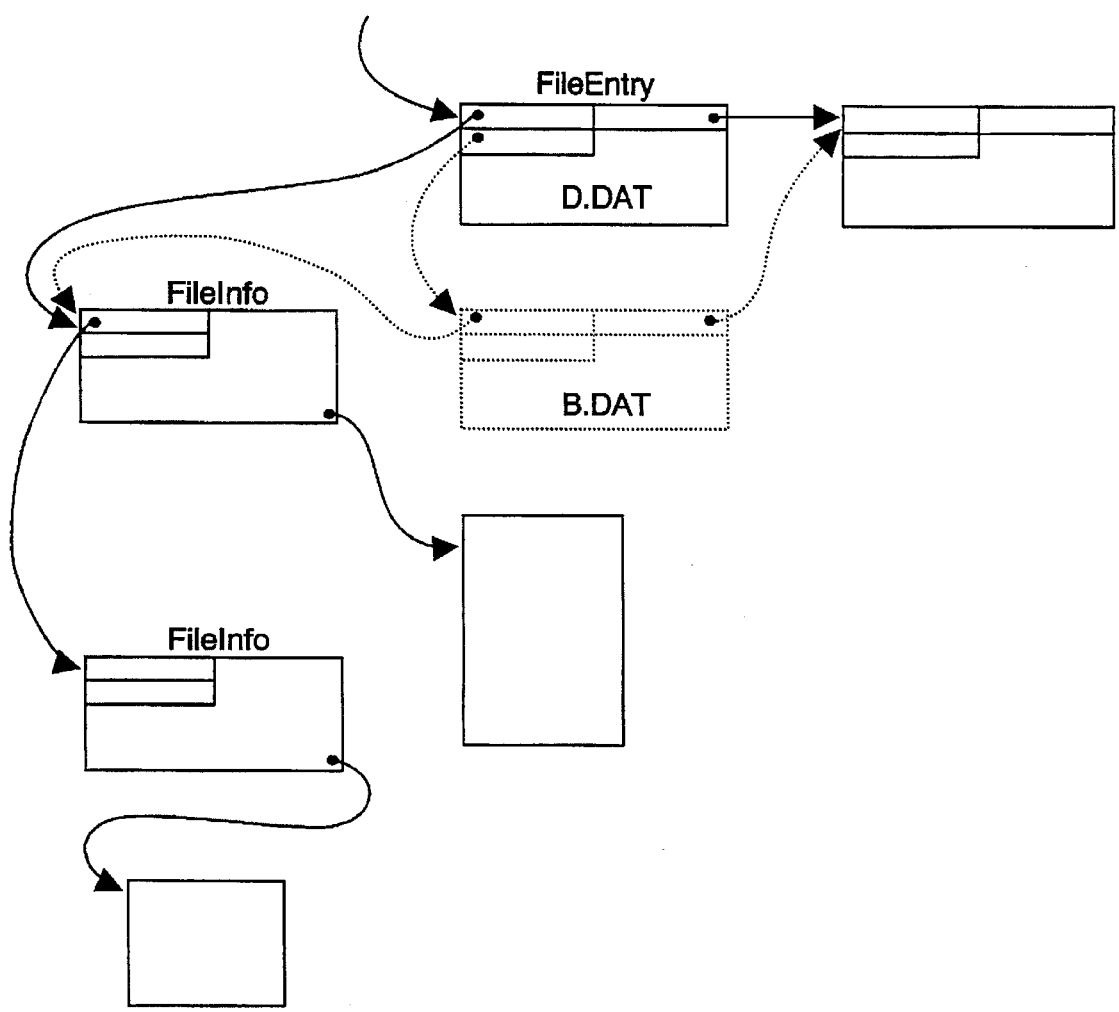
FIG. 20 shows the before and after representation of the directory structure for a file that has had its name changed.

The name of a directory or file is changed by allocating a new DirEntry or FileEntry, respectively, and then setting the SecondaryPtr of the old entry to point the new entry. FIG. 20 shows the file entry for "D.DAT" in solid lines and the changes in broken lines when the name is changed to "B.DAT". The new entry points to the linked list of FileInfo entries, the directory structure, and the extents associated with the old entry.

Figure 19:
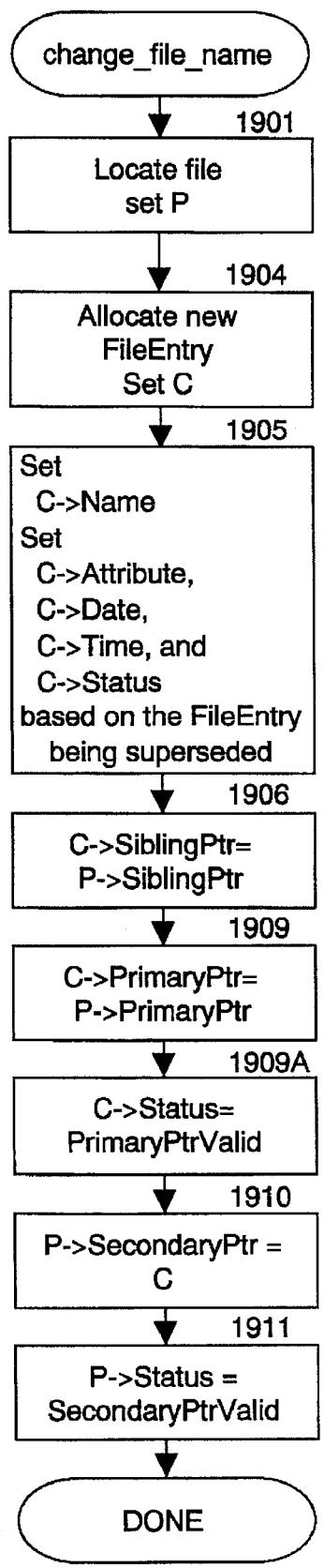
FIG. 19 shows a flow diagram of the Change_File_Name routine in a preferred embodiment of the present invention.

FIG. 19 is a flow diagram of a preferred subroutine that implements the changing of a file name. The subroutine for changing a directory name is similar, except that there are no associated extents. The input parameters to this routine are the pathname of the file and the new file name. In block 1901, the system searches through the directory structure and locates the file whose name is to be changed and sets the variable P to point to the FileEntry. The system searches for the last FileEntry in the linked list of entries for the file. A file will have an entry for each name change.

In block 1904, the system allocates a region for the new FileEntry and sets the variable C to point to the region. In block 1905, the system sets C->Name equal to the new file name and sets C->Attributes, C->Date, C->Time, and sets C->Status based on the file entry being superseded to ATDRecent. In block 1906, the system sets C->SiblingPtr equal to P->SiblingPtr to link the entry into the directory hierarchy. In block 1909, the system sets C->PrimaryPtr equal to P->PrimaryPtr to link the new entry to the list of extents. In block 1909A, the system sets C->Status to indicate ExtentPtr and PrimaryPtr are valid. In block 1910, the system sets P->SecondaryPtr equal to the pointer to C. In block 1910A, the system sets P->Status to indicate SecondaryPtr is valid to complete the replacement of the old entry and the routine completes.

Figure 21A:
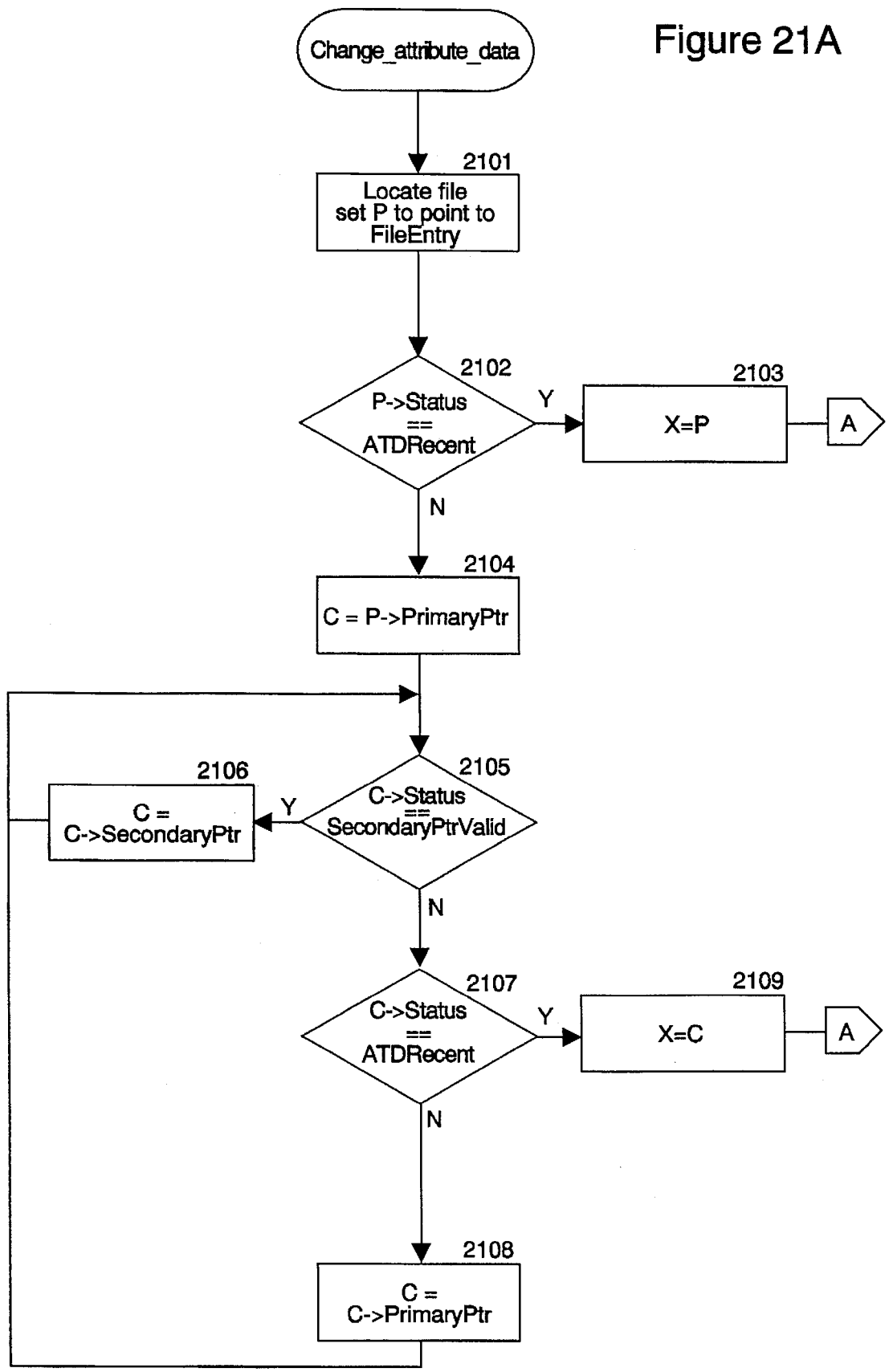
FIGS. 21A–21B shows a flow diagram of the Change_Attribute_Data routine in a preferred embodiment of the present invention.
Figure 21B:
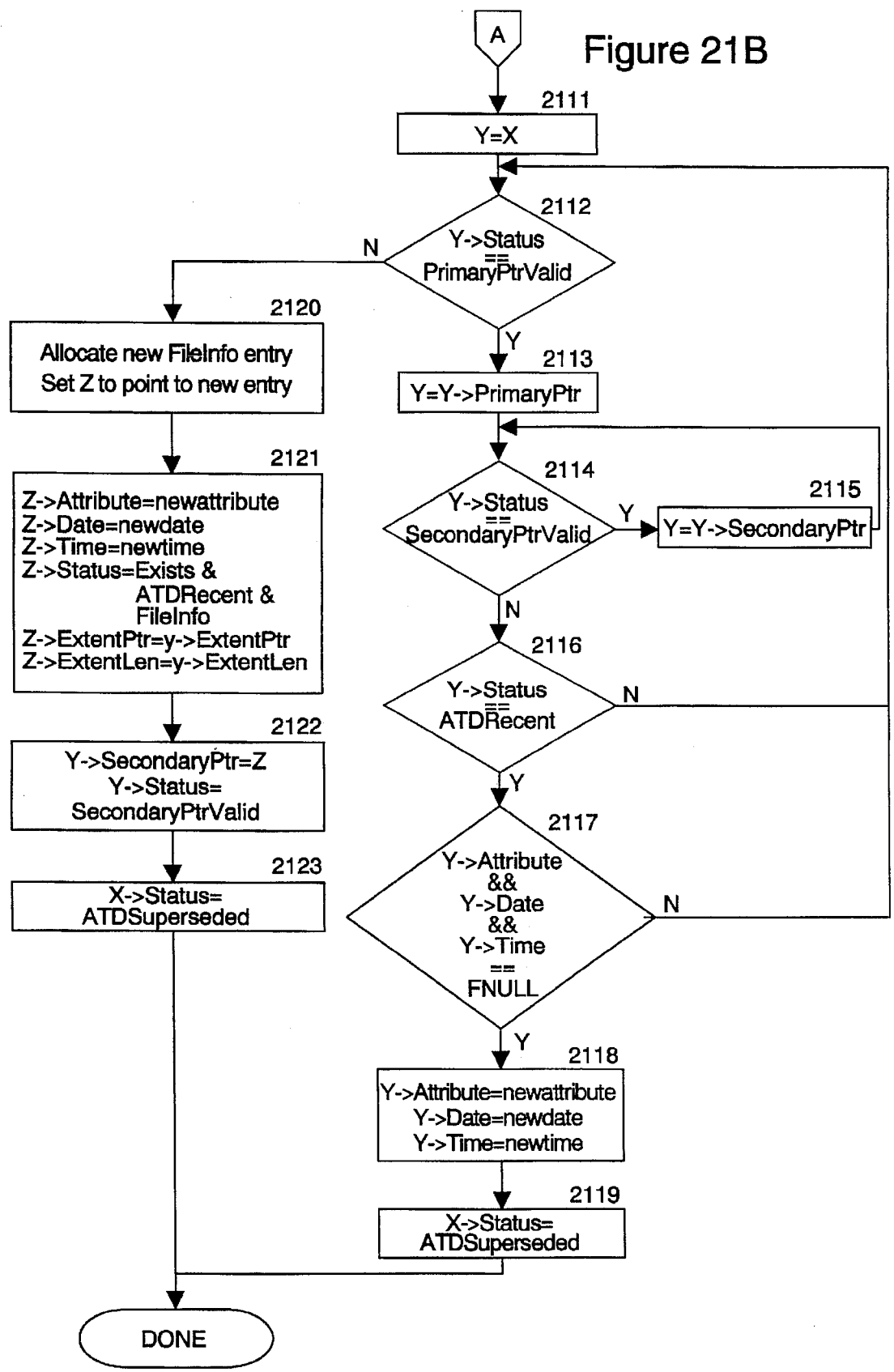

FIGS. 21A–21B shows a flow diagram of a routine that changes the attribute data of a file. The attribute data associated with a file is changed by selecting the first FileInfo entry with a status of ATDRecent and with the attribute, date, and time fields set to FNULL. If no such field exists, then a new FileInfo entry is created and selected. The system then sets the attributes, date, and time fields in the selected FileInfo entry. The FileInfo entry that previously stored the most recent attribute, date, and time data has its status set to ATDSuperseded. The input parameters are the pathname and the attribute data. In block 2101, the system searches through the directory structure to locate the file and sets the variable P to point to the FileEntry. In block 2102, if P->Status indicates ATDRecent, then the FileEntry contains the most recent attribute data and the system continues at block 2103, else the system continues at block 2104. In block 2103, the system sets variable X to variable P and continues at block 2111. In block 2104, the system sets variable C equal to P->PrimaryPtr. In blocks 2105 through 2108, the system loops searching for the FileInfo entry with status indicating the most recent attribute data. In block 2105, if C->Status indicates that the SecondaryPtr is valid, then the system continues at block 2106, else the system continues at block 2107. In block 2106, the system sets variable C equal to C->SecondaryPtr to point to the overriding entry and loops to block 2105. In block 2107, if C->Status indicates ATDRecent, then the FileInfo entry contains the most recent attribute data and the system continues at block 2109, else the system continues at block 2108. In block 2108, the system sets variable C equal to C->PrimaryPtr and loops to block 2105. In block 2109, the system sets variable X to variable C and continues at block 2111.

In block 2111, the system initializes variable Y to variable X. Variable X points to the entry with the most recent attribute data. In block 2112 through 2119, the system locates the next entry with a status of most recent and attribute data set to FNULLs. In block 2112, if Y->Status indicates that PrimaryPtr is valid, then the system continues to block 2113, else a new entry is to be added and the system continues at block 2120. In block 2113, the system sets variable Y equal to Y->PrimaryPtr. In block 2114, if Y->Status indicates that the SecondaryPtr is valid, then the system continues at block 2115, else the system continues at block 2116. In block 2115, the system sets variable Y equal to Y->SecondaryPtr and loops to block 2114. In block 2116, if Y->Status is set to ATDRecent, then the system continues at block 2117, else the system loops to block 2112. In block 2117, if Y->Attribute, Y->Date, and Y->Time equal FNULL, then the system continues at block 2118, else the system loops to block 2112. In block 2118, the system sets Y->Attribute, Y->Date, and Y->Time to the new attribute data. In block 2119, the system sets X->Status equal to ATDSuperseded and the routine completes.

In blocks 2120 through 2123, the system allocates and initializes a new FileInfo entry. In block 2120, the system allocates a new FileInfo entry and sets variable Z to point to the new entry. In block 2121, the system sets Z->Attribute, Z->Date, and Z->Time to the new attribute data, sets Z->Status to Exists, ATDRecent, and FileInfo, sets Z->ExtentPtr to Y->ExtentPtr, and sets Z->ExtentLen to Y->ExtentLen. In block 2122, the system sets Y->SecondaryPtr equal to variable Z and Y->Status to indicate that SecondaryPtr is valid. In block 2123, the system sets X->Status equal to ATDSuperseded to indicate that entry no longer contains the current attribute data and the routine completes.

Although the present invention has been described in terms of preferred embodiment, it is not intended that the invention be limited to this embodiment. Modifications within the spirit of the invention will be apparent to those skilled in the art. The scope of the present invention is defined by the claims that follow.

We claim:

1. A block-erasable, write-once, multiple-read memory device, the memory device having one or more blocks, comprising:
   a data region area in each block, the data region area divided into a plurality of data regions for storing data; and a block structure stored in each block, the block structure having a header and an allocation array, the header containing block-specific information, the allocation array containing an entry corresponding to each data region, each entry containing information relating to the corresponding data region.

2. The memory device of claim 1 wherein the header contains a logical block number, a block status, and a block erase count.

3. The memory device of claim 1 wherein an allocation array entry contains a pointer to the corresponding data region, a length indicating the length of the corresponding data region, and an allocation array entry status.

4. The memory device of claim 1 wherein the memory device is a block-erasable, programmable, read-only memory.

5. A method of memory management in a block-erasable, programmable, read-only memory, the memory comprising a plurality of blocks, method comprising the steps of:

storing block header information in each block;

storing an allocation table in each block; and storing data in a data storage area in each block.

6. The method of claim 5 wherein the block header information includes a logical block number, a block status, and a block erase count.

7. The method of claim 5 wherein the allocation table contains entries corresponding to portions of the data storage area, the entries containing a pointer to the corresponding portion of the data storage area, a length indicating the length of the corresponding portion of the data storage area, and a status indicating the status of the entry.

8. A method of managing a block-erasable, write-once, read-many memory in a computer, the memory being divided into blocks of memory locations, each block including an allocation array, data regions, and free space, the allocation array with entries corresponding to the data regions, the method comprising the steps of:

receiving a request to store data in the memory, the request including the data to be stored;

selecting a block in the memory with sufficient free space to store the data and to store a corresponding entry in the allocation array; and allocating a new data region in the free space of the block in which to store the data by:

selecting an allocation array entry to correspond to the new data region;

selecting the new data region;

setting the selected allocation array entry to contain a reference to the new data region within the block and to indicate that the new data region is allocated; and storing the data in the new data region, thereby completing the allocation of the new data region.

9. The method of claim 8 wherein the allocation array and the data regions are located at opposite ends of the block and as new data regions and allocation array entries are selected, the allocation array and the data regions grow towards each other.

10. The method of claim 8 wherein each block has an erase count that indicates the number of times the block has been erased and wherein the step of selecting a block in the memory further comprises the step of selecting the block in the memory based on the erase count.

11. The method of claim 8, further comprising the step of deallocating a data region in the block by setting the corresponding allocation array entry to indicate that the data region is deallocated.

12. The method of claim 11, further comprising the step of reclaiming deallocated data regions in the block by:

selecting a spare block in the memory;

erasing the spare block; and for each allocation array entry, determining whether the corresponding data region is allocated or deallocated;

when the corresponding data region is allocated, copying the corresponding data region to the spare block and setting the allocation array entry of the spare block to contain a reference to the data region within the spare block and to indicate that the data region is allocated; and when the corresponding data region is deallocated, setting the allocation array entry of the spare block to indicate that the corresponding data region is free, thereby reclaiming the deallocated data regions.

13. The method of claim 12 wherein each block has an erase count that indicates the number of times the block has been erased and wherein the step of selecting a spare block in the memory further comprises the step of selecting the spare block in the memory based on the erase count.

14. The method of claim 8, including the step of, before setting the selected allocation array entry to contain a reference to the new data region, setting the selected allocation array entry to allocation-in-process wherein the step of setting the selected allocation array entry to allocated occurs after the data is stored in the new data region so that if an error occurs when storing the data, the selected allocation array entry will not falsely indicate that the data has been correctly stored in the new data region.

15. The method of claim 8 wherein the step of selecting an allocation array entry selects an entry that was set to free indicating that its corresponding data region was reclaimed.

16. A method of referencing a data region in a block-erasable, write-once, read-many memory, the memory being divided into blocks of memory locations, each block having a logical block number and a physical block number, each block including an allocation array and data regions, the allocation array with entries corresponding to the data regions, the method comprising:

storing an allocation array in blocks of the block-erasable, write-once, read-only memory, each allocation array entry containing an offset of the corresponding data region within the block and having an index;

storing a logical block number and a corresponding physical block number and physical start address for each block in a block translation cache;

specifying a data region in a block of the block-erasable, write-once, read-only memory by logical block number and allocation array entry index; and generating a physical address of the specified data region by:

determining the physical block number of the block from the logical block number using the block translation cache;

determining the physical start address of the block from the determined physical block number;

retrieving from the allocation array entry index the offset of the specified data region within that block within the block with the determined physical block number; and adding the retrieved offset to the physical start address of the block, thereby generating the physical address of the specified data region.

17. A method of referencing a block in a block-erasable, write-once, read-many memory, the memory being divided into blocks of memory locations, each block having a logical block number and a physical block number, each block including an allocation array and data regions, the allocation array with entries corresponding to the data regions, the method comprising:

storing a logical block number in each block of the block-erasable, write-once, read-only memory;

at initialization, reading the logical block number in each block and storing the logical block number and a corresponding physical block number for each block in a block translation cache;

specifying a block of the block-erasable, write-once, read-only memory by logical block number; and generating a physical address of the specified block by:
determining the physical block number of the block from the logical block number using the block translation cache; and
determining a physical start address of the block from the determined physical block number.

18. A method of leveling erase counts in a block-erasable, write-once, read-many memory, the memory being divided into blocks of memory locations, each block having an erase count that indicates the number of times the block has been erased, the method comprising the steps of:

identifying a first block of the block-erasable, write-once, read-only memory that has an erase count;

identifying a second block of the block-erasable, write-once, read-only memory that has a lower erase count than the first block;

copying the data in the first block to a spare block;

erasing the first block;

incrementing the erase count for the first block;

storing the incremented erase count for the first block in the first block;

copying the data from the second block to the first block;

erasing the second block;

incrementing the erase count for the second block;

storing the incremented erase count for the second block in the second block; and copying the data from the spare block to the second block.

19. A method for reclaiming memory within a source block in block-erasable, write-once, read-many memory device, the source block having an allocation array and data regions, each data region being allocated or not allocated, the allocation array having entries that reference a data region, each data region being identifiable by an index within the allocation array of the entry that references the data region, the method comprising: for each entry in the allocation array, determining whether the referenced data region is allocated;

when the referenced data region is allocated, copying the referenced data region to a data region within a spare block and setting an entry in an allocation array of the spare block to reference the copy of the data region, the entry in the allocation array of the spare block having the same index within the allocation array of the spare block as the entry within the allocation array of the source block so that the data region in the spare block is identifiable by the same index by which the data region of the source block is identifiable, whereby data regions that are not allocated are not copied to the spare block.

20. The method of claim 19, including:
when the referenced data region is not allocated, setting an entry in the allocation table of the spare block to free so that the entry may be used to reference a newly allocated data region of the spare block after completion of reclamation.

21. The method of claim 20 wherein a data region that is not allocated is a data region that has been deallocated.

22. The method of claim 20 wherein a data region that is not allocated is a data region that has been superseded by another data region within the source block.

23. The method of claim 19, including, after copying each allocated data region of the source block, erasing the source block.

24. The method of claim 19 including after copying each allocated data region of the source block, directing each access for data of a data region to the spare block.

25. A method for reclaiming memory within a block in block-erasable, write-once, read-many memory device, the block having an allocation array and data regions, each data region being allocated or not allocated, the allocation array having entries that reference a data region, each data region being identifiable by an index within the allocation array of the entry that references the data region, the method comprising:

copying the allocated regions and the entries that reference the allocated regions from the block to a temporary memory;

erasing the block; and for each entry copied,
copying the data region referenced by that entry from the temporary memory to a data region within the erased block and setting an entry in an allocation array of the erase block to reference the copy of the data region, the entry in the allocation array of the erased block having the same index within the allocation array of the erased block as the entry within the allocation array of the block before being erased so that the data region is identifiable by the same index after reclamation.

26. A block erasable, write-once, read-many memory device with a plurality of blocks, containing within a block:

a plurality of data regions; and an allocation array with an entry for each data region, each entry having a reference to the data region.

27. The memory device of claim 26 wherein the reference is an offset of the start of the data region.

28. The memory device of claim 27 wherein the data regions are variable length and an entry contain the length of the data region.

29. The memory device of claim 26 wherein a block further contains a logical block number.

30. The memory device of claim 26 wherein a block further contains an erase count.

31. The memory device of claim 26 wherein a block further contains a write count.

32. The memory device of claim 26 wherein an entry contains an indication of state that is either allocated, deallocated, superseded, or free.

33. The memory device of claim 26 wherein a block contains an indication of state that is either spare, erased, or ready.

34. A computer-readable medium containing instruction for causing a computer system to reclaim memory within a source block in block-erasable, write-once, read-many memory device, the source block having an allocation array and data regions, each data region being allocated or not allocated, the allocation array having entries that reference a data region, each data region being identifiable by an index within the allocation array of the entry that references the data region, by the method of:

for each entry in the allocation array,
determining whether the referenced data region is allocated;
when the referenced data region is allocated, copying the referenced data region to a data region within a spare block and setting an entry in an allocation array of the spare block to reference the copy of the data region, the entry in the allocation array of the spare block having the same index within the allocation array of the spare block as the entry within the allocation array of the source block so that the data region in the spare block is identifiable by the same index by which the data region of the source block is identifiable, whereby data regions that are not allocated are not copied to the spare block.

35. The computer-readable medium of claim 34, including:

when the referenced data region is not allocated, setting an entry in the allocation table of the spare block to free so that the entry may be used to reference a newly allocated data region of the spare block after completion of reclamation.

36. The computer-readable medium of claim 35 wherein a data region that is not allocated is a data region that has been deallocated.

37. The computer-readable medium of claim 35 wherein a data region that is not allocated is a data region that has been superseded by another data region within the source block.

38. The computer-readable medium of claim 34, including, after copying each allocated data region of the source block, erasing the source block.

39. The computer-readable medium of claim 34 including after copying each allocated data region of the source block, directing each access for data of a data region to the spare block.

40. A computer-readable memory containing instruction for causing a computer system to manage a block-erasable, write-once, read-many memory in a computer, the memory being divided into blocks of memory locations, each block including an allocation array, data regions, and free space, the allocation array with entries corresponding to the data regions, by the steps of:

selecting a block in the memory with sufficient free space to store data and to store a corresponding entry in the allocation array; and
allocating a new data region in the free space of the block in which to store the data by:
selecting an allocation array entry to correspond to the new data region;
selecting the new data region;
setting the selected allocation array entry to contain a reference to the new data region within the block and to indicate that the new data region is allocated; and
storing the data in the new data region, thereby completing the allocation of the new data region.

41. The computer-readable memory of claim 40 wherein the allocation array and the data regions are located at opposite ends of the block and as new data regions and allocation array entries are selected, the allocation array and the data regions grow towards each other.

42. The computer-readable memory of claim 40 wherein each block has an erase count that indicates the number of times the block has been erased and wherein the step of selecting a block in the memory further comprises the step of selecting the block in the memory based on the erase count.

43. The computer-readable memory of claim 40, further comprising the step of deallocating a data region in the block by setting the corresponding allocation array entry to indicate that the data region is deallocated.

44. The computer-readable memory of claim 40, including the step of, before setting the selected allocation array entry to contain a reference to the new data region, setting the selected allocation array entry to allocation-in-process wherein the step of setting the selected allocation array entry to allocated occurs after the data is stored in the new data region so that if an error occurs when storing the data, the selected allocation array entry will not falsely indicate that the data has been correctly stored in the new data region.

45. The computer-readable memory of claim 40 wherein the step of selecting an allocation array entry selects an entry that was set to free indicating that its corresponding data region was reclaimed.

* * * * *